(12) United States Patent
Beshai et al.

(10) Patent No.: US 7,573,826 B1
(45) Date of Patent: Aug. 11, 2009

(54) DARWINIAN NETWORK

(75) Inventors: Maged E. Beshai, Stittsville (CA);
Silvana D. Romagnino, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 683 days.

(21) Appl. No.: 11/220,126

(22) Filed: Sep. 6, 2005

Related U.S. Application Data

(63) Continuation-in-part of application No. 10/872,434, filed on Jun. 22, 2004, now Pat. No. 6,947,424, and a continuation-in-part of application No. 10/983,497, filed on Nov. 8, 2004.

(51) Int. Cl.
*G01R 31/08* (2006.01)
(52) U.S. Cl. ...................................... 370/241; 370/252

(58) Field of Classification Search ....................... None
See application file for complete search history.

(56) References Cited

U.S. PATENT DOCUMENTS

| | | | |
|---|---|---|---|
| 2003/0179705 A1* | 9/2003 | Kojima | 370/230 |
| 2008/0069151 A1* | 3/2008 | Satoh et al. | 370/503 |
| 2008/0232809 A1* | 9/2008 | Beshai et al. | 398/98 |
| 2008/0253294 A1* | 10/2008 | Ripa et al. | 370/242 |

* cited by examiner

*Primary Examiner*—Phirin Sam
(74) *Attorney, Agent, or Firm*—Anderson Gorecki & Manaras LLP

(57) ABSTRACT

A future-proof network comprising multiple independent core media and universal edge nodes is disclosed. The edge nodes are equipped to evaluate the performance of each of the core media. Network-fabric decoupling and, more importantly protocol decoupling, permit graceful retirement of inferior core media and growth of superior core media.

8 Claims, 12 Drawing Sheets

DARWINIAN NETWORK

CROSS-REFERENCE TO RELATED APPLICATIONS

This application is a continuation in part of U.S. patent application Ser. No. 10/872,434, filed Jun. 22, 2004 now U.S. Pat. No. 6,947,424 and U.S. patent application Ser. No. 10/983,497, filed Nov. 8, 2004.

FIELD OF THE INVENTION

The present invention relates to data networks and, in particular, to a high-capacity multi-generation network employing high capacity multi-grained universal edge nodes and methods used by the universal edge nodes.

BACKGROUND

Technological advances in both electronics and optics pave the way for creating new telecommunications networks that may be structurally and functionally superior to networks based on prior technology. The introduction of a new network to replace an existing network is not, however, an easy task, given the investment made to build the existing network and the risk of deploying untried technology. A tempting approach of incorporating new technology is to consider interposing new advanced network elements in an existing network to accommodate traffic growth. However, the drawback of mingling the old and the new network elements is multifold: (1) such blending would inevitably lead to a complex network having inter-dependent multi-generation components; (2) the interworking of multi-generation components may require complex protocols; (3) flow control and routing may become unwieldy; and (4) new features may be difficult to introduce.

One of the incentives for creating new telecommunication networks is the inadequacy of legacy networks. A glaring example of an inadequate network is the present global data network, the Internet, which evolved rapidly from an experimental network of very limited coverage to a popular network of world-wide coverage. However, the Internet architecture that was intended for limited coverage remained virtually unchanged. The experimental Internet was meant to provide a proof of concept; scalability, service reliability, and service quality were not a concern. Consequently, during its rapid growth, piecemeal measures had to be taken. The adverse result of continuous Internet patching is a complex unmanageable network structure that cannot realize the vision of an omnipresent universal network capable of providing flexible inexpensive broadband services. Such a universal network would spur economic growth and redefine the role that telecommunications can play in the development and welfare of the human society.

Network-element capability dictates the network structure. Technological advances permit the development of powerful new network elements of large dimension, higher speed, better performance, and low cost. Consequently, new network structures can be developed to provide new services with superior performance. Meanwhile, legacy network structures based on prior-art network elements may not be adaptable to benefit from technological advances.

There is a need, therefore, to explore a new means for introducing new network elements and new network structures to avoid undesirable patching and interworking drawbacks.

SUMMARY

It is therefore an object of the present invention to provide a network design method and apparatus which facilitate the deployment of new network structures while accommodating old structures. The invention provides a network comprising a plurality of decoupled core media, potentially of different structures, and means for self-evaluation to determine merits of each core medium.

In accordance with an aspect of the present invention, there is provided a Darwinian network comprising: a plurality of core media each of the core media including a respective plurality of core nodes; a plurality of edge nodes each edge node having at least one dual communication channel to at least one core node in each of at least one of the plurality of core media; and a core-evaluation module associated with each of at least two edge nodes from among the plurality of edge nodes, where the core-evaluation module is operable to determine at least one performance index for each of at least one core medium.

In accordance with another aspect, there is provided an edge node comprising: a plurality of input ports, a plurality of output ports, and an edge controller. At least one input port connects to traffic sources and at least one input port connects to a core medium from among a plurality of core media. At least one output port connects to traffic sinks and at least one output port connects to a core medium from among the plurality of core media. The edge controller is operable to: forward information signals received from the plurality of input ports to at least one core medium from among the plurality of core media; and forward probing signals along routes to a plurality of destination edge nodes through at least one of the core media.

In accordance with a further aspect of the present invention, there is provided a method of performance evaluation in a network comprising a plurality of edge nodes interconnected by a plurality of core media, where each edge node has a local cyclical time indicator of a predefined cyclical period. The method is implemented at a selected edge node from among the plurality of edge nodes and comprises steps of: transmitting outgoing probing signals to selected destination edge nodes through at least one of the core media; receiving incoming probing signals transmitted from a subset of the plurality of edge nodes through the at least one of the core media; and processing the incoming probing signals to determine performance indices of each of the at least one of the core media.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

TERMINOLOGY

Figure 1:
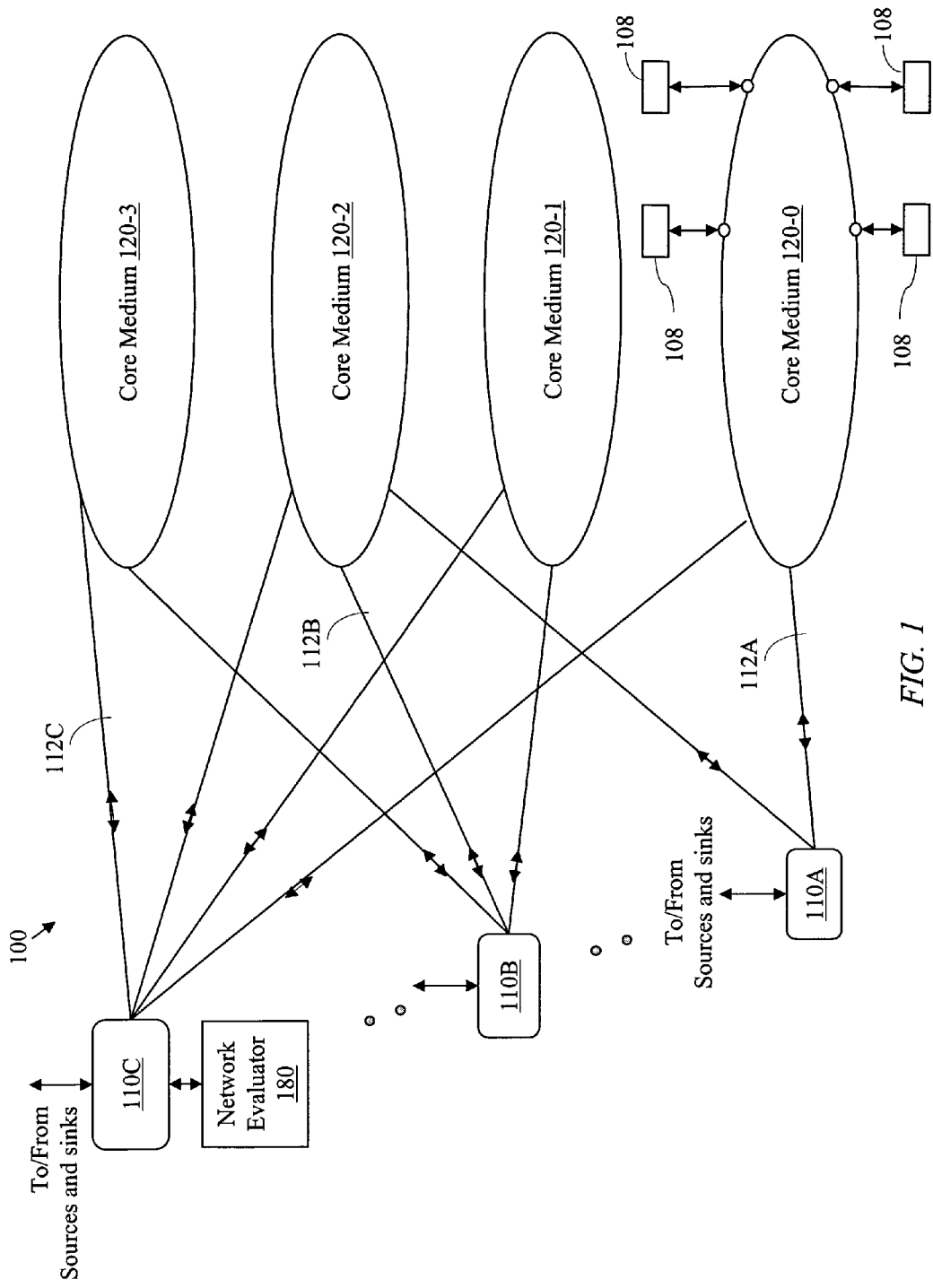
FIG. 1 illustrates a network comprising four core media, in accordance with an embodiment of the present invention.

Definitions of terms used in this disclosure are listed below:

Source node: A source node aggregates data traffic from several traffic sources and transmits the aggregate data traffic to another node for switching towards specified destinations.

Sink node: A sink node receives data traffic destined to several traffic sinks and switches the traffic to respective traffic sinks.

Edge node: An edge node combines a source node and a sink node and it is a common practice to have the constituent source node and sink node of an edge node share a common data memory and a common controller, hereinafter called "edge controller". Where a distinction between a source node and a sink node of the same edge node is not necessary, either may be referenced as an edge node.

An edge node includes outer ports (access ports) and inner ports. The outer ports include ingress ports and egress ports. An edge node supports traffic sources and traffic sinks where traffic sources are connected to ingress ports of the edge node and traffic sinks are connected to egress ports. An edge node receives data from data sources and assembles the data into information signals to be transmitted across at least one of different core media.

Sharing a common memory enables direct internal switching from the traffic sources to the traffic sinks of an edge node. It also enables the use of an edge node for tandem switching of traffic originating from and destined to other edge nodes. The network structure and controls, according to the present invention, attempt to significantly reduce the need for such tandem switching.

Outer ports: The outer ports of an edge node comprise ingress ports that receive signals from traffic sources and egress ports that transmit signals to traffic sinks.

Inner ports: The inner ports of an edge node comprise inbound ports that receive signals from external nodes and outbound ports that transmit signals to external nodes.

Core node: A core node has inlet ports that receive signals from external nodes and outlet ports that transmit signals to external nodes. The inlet ports receive signals from edge nodes (source nodes) through outbound links originating from the edge nodes and the outlet ports transmit signals to edge nodes (sink nodes) on inbound links of the edge nodes.

Nodal Dimension: The dimension of a node (an edge node or a core node) is defined by the number of its input ports and output ports. The dimension is conventionally expressed in the form m×n, where m is the number of input ports and n is the number of output ports. The ports may have different capacities.

Nodal Degree: The degree of a specific node is the number of adjacent nodes to which the specific node connects. The highest degree of a node equals the dimension of the node.

Access capacity and inner capacity: The access capacity (also called outer capacity) of a network is the total capacity of the access ports (outer ports) of the network's edge nodes and the inner capacity is the total capacity of the inner ports of a network. The access capacity is the capacity available to network users. In an ideal network, the ratio of inner capacity to access capacity is close to unity. A high ratio is generally indicative of an inefficient network.

Inbound and outbound capacity: The inbound capacity of an edge node is the combined capacity of its inbound ports and the outbound capacity is the combined capacity of its outbound ports.

Input side: The input side of an edge node (or a core node) refers to the input ports of the edge node (or the core node).

Output side: The output side of an edge node (or a core connector) refers to the output ports of the edge node (or the core node).

Adjacent nodes: A first node is said to be adjacent to a second node if there is a direct channel from the second node to the first node. A direct channel is a channel that does not traverse an intermediate switching node.

Adjacency: The adjacency of a reference node is defined as the number of adjacent nodes to the reference node.

Network connectivity: The set of links interconnecting the edge nodes, either directly or through core nodes, define network connectivity.

Optical node: An optical node can be a static (passive) wavelength router, a space switch switching wavelength-channel bands, a space switch switching wavelength channels, or a space-time switch operated in a time-shared mode switching time-slots of wavelength channels.

Link: A link comprises at least one communication channel. A WDM (wavelength-division-multiplexed) link refers to a fiber link carrying a WDM optical signal. A WDM link has at least one wavelength channel.

Route set: A route set is defined for each directional pair of edge nodes. The route set is directional in the sense that the routes from a first edge node to a second edge node are not necessarily derived by reversing the routes from the second edge node to the first edge node. The routes in a route set are pre-calculated and updated only when edge nodes, core nodes, or links are installed in the network (or removed from the network). When a node or a link is temporarily unavailable, only routes that are affected by the unavailability are marked as temporarily unavailable and other routes in respective route sets are used.

DETAILED DESCRIPTION

Rethinking the Network

There are several compelling reasons for introducing fundamental changes to current telecommunications networks, amongst which:

(1) new network services having diverse flow rates, for example from 1 kilobits per second to 100 megabits per second, would naturally call for a multi-granular network;

(2) realizing high service quality requires a network of small diameter, where a data unit may traverse a small number (preferably not exceeding two) of intermediate switching elements between a source node and a destination node; and (3) advanced network components enable realization of rational network structures that are much more economical and easier to operate than current networks.

With continuous advances in both electronic and optical network components, the network inevitably has to operate with multi-generation equipment. The main building block in a telecommunication network is a switching node, and a major factor that influences the shape of the network is the degree of each switching node. The nodal degree of a specific switching node is the number of adjacent nodes to which the specific node directly connects. As the nodal degree increases, the network diameter decreases rapidly; the network diameter is an indication of the number of intermediate nodes traversed by a path from a source edge node to a sink edge node. A decrease in network diameter decreases network complexity (hence cost) and improves network performance. The network diameter may be defined in terms of a traffic weighted mean number of hops per route for selected routes. Advances in electronic components enable the development of versatile high-capacity switching nodes of large dimension. A switching node of large dimension (hence large degree) can connect to a large number of adjacent nodes, hence reducing the diameter of the network.

Interworking of multi-generation equipment in a single network fabric may enormously complicate the network and impede the introduction of new services. A simpler solution, according to the present invention, is to organize the network in the form of independent core media connecting to universal edge nodes with a much reduced Interworking effort. A universal edge node is a scalable switching node capable of switching data of distinctly different granularities and interfacing with core nodes of different types. Each core medium may comprise switching nodes of the same species. Each universal edge node may interface with at least one core node of at least one core medium so that each universal edge node may connect to each other universal edge node through a path traversing a single core medium or more than one core medium. Thus, a universal edge node hosts traffic sources and sinks, connects to core media, and may also function as an interconnection point of different core media. Preferably, at least one universal edge node interfaces with at least one core node from each of the core media to reduce the mean number of traversed core media. One motivation to adopt the parallel-core-media network is to exploit potential advantages of new network elements and to foster acceptance of untried technological advances. For example, when fast photonic switching becomes economically viable, there may still be reluctance to rely on a network core medium comprising solely photonic switches. Such reluctance would impede progress. However, if a core medium comprising fast photonic switches is deployed in parallel with a current core medium, and as fast photonic switches prove their reliability, performance, and economy, a gradual shift towards their deployment may take place.

A core medium may comprise a number of static channel routers (such as Arrayed Waveguide Grating (AWG) wavelength routers, often referenced as AWGR), a set of independent switching core nodes, or interconnected switching core nodes. The parallel core media may include legacy core media and new core media. Legacy core media may include a core network comprising Internet-Protocol (IP) core routers interconnected by wavelength channels, a core network comprising coarse SONET (Synchronous Optical Network) cross-connectors or SDH (Synchronous Digital Hierarchy) cross-connectors, or a core network comprising IP core routers interconnected through SONET/SDH coarse cross connectors. A new core medium may comprise passive wavelength routers interconnecting the universal edge nodes, or flexible time-shared optical switches operable to provide paths of adaptive capacities between edge nodes; the capacities of such paths may be updated within a short period (of a few milliseconds, for example) determined by the propagation delay along each path. The time-shared optical switches may operate in a time-division-multiplexed (TDM) mode, burst-switching mode, or both.

Edge Control

An edge-controlled network of an arbitrary structure in which paths of adaptive capacity are established from each source node to each sink node enhances scalability and performance while simplifying network control. Such a network may use autonomous admission control which relies neither on user's specifications of required capacity nor on user's declaration of traffic descriptors. An autonomous-control mechanism is disclosed in U.S. Pat. No. 6,356,546, titled "Universal transfer method and network with distributed switch", issued to Beshai on Mar. 12, 2002. A Universal Internet Protocol (UIP), which can work independently, or in conjunction with the autonomous admission-control mechanism, governs the communications among network nodes.

An edge node in a network employing multi-grained core nodes would have inner ports (the ports facing the network core) of different granularities. A configuration of a multi-granular edge node is disclosed in Applicant's U.S. patent application Ser. No. 10/983,497, filed Nov. 8, 2004 and titled "Multi-Grained Network". The edge node described in application Ser. No. 10/983,497 comprises: a plurality of ingress ports for receiving data from local sources; a plurality of output ports divided into output-port groups each output-port group communicatively coupled to a core node from among a plurality of core nodes of different granularities; a plurality of egress ports for transmitting data to local sinks; a plurality of input ports each input port communicatively coupled to a core node from among the plurality of core nodes; and a plurality of memory devices each cyclically connecting to each of the ingress ports, input ports, output ports, and egress ports. Each memory device is logically partitioned into a first plurality of memory blocks each corresponding to a specific egress port and a second plurality of memory blocks divided into memory-block groups having a one-to-one correspondence to the output-port groups. At least one of the output-ports has a memory device for decoupling a scheduling process in the edge node from a scheduling process in a bufferless data-segment-switching core node. The edge node has a controller operable to: (a) receive a request for establishing a connection, the request specifying an ingress port from the plurality of ingress ports, a destination edge node, and a capacity requirement; (b) determine a preferred granularity for the capacity requirement; (c) select, according to the preferred granularity, a matching core node from among the plurality of core nodes for routing the connection to a destination edge node; and (4) communicate with the matching core node to schedule the connection. The controller is further operable to select a core node, from among the plurality of core nodes, having a finer granularity than the granularity of the matching core node if the matching core node fails to schedule the connection. The granularity may be defined by a time-slot in a time-frame, a channel, or a band of channels.

Core Media Decoupling

One of the main advantages of deploying parallel core media is the resulting protocol decoupling in the network core which greatly simplifies the operation of the entire network. Each edge node connecting to more than one core medium in a parallel-core network has interfaces suitable for each of the core media to which the edge node connects. The edge node performs its internal switching from input output based on arbitrary data segmentation that need not conform to any external data format dictated by external network protocols. At an input interface of the edge node, signals received from a core node of a respective core medium are structured according to the internal format of the edge node. At an output interface, data to be transmitted through a respective core medium is structured according to a format dictated by the respective core medium.

Darwinian Network

A Darwinian network is a network structured and operated in a manner that permits coexistence of multiple technologies while providing metrics to facilitate selection of the "fittest" technology. If old and new network technologies are mingled in a structure where they become interdependent, then the fittest will have to forever coexist with the weakest, resulting in a complex inefficient network. Thus, multi-generation structures preferably operate in parallel. A Darwinian network, according to the present invention, is a parallel-core-media network having means for comparative evaluation of the core media.

FIG. 1 illustrates a Darwinian network 100 comprising a plurality of universal edge nodes 110 each connecting to selected core media 120 from among four core media 120-0, 120-1, 120-2, and 120-3 by links 112 where a link 112 may have multiple channels. Although four core media 120 are illustrated, it is understood that the number of core media in a Darwinian network 100 is arbitrary. Any of the illustrated connection links 112 may be a unidirectional or a bidirectional link. Core medium 120-0 comprises legacy core nodes and may support inflexible edge nodes 108 that cannot communicate with the other core media 120-1, 120-2, or 120-3 and cannot participate in a network-evaluation process as will be described later. Three universal edge nodes 110A, 110B, and 110C from among the plurality of universal edge nodes 110, are illustrated. Edge node 110A connects to two core media 120-0 and 120-2 through links 112A, edge node 110B connects to the three core media 120-1, 120-2, and 120-3 through links 112B, and edge node 110C connects to the four core media 120-0, 120-1, 120-2 and 120-3 through links 112C. An edge node 110 may, however, connect to only one core medium 120. Each edge node 110 has its own edge controller (not illustrated in FIG. 1). A global network evaluator 180 is supported by edge node 110C which is accessible through each of the core media 120-0, 120-1, 120-2, and 120-3. The global network evaluator 180 may receive and process network measurements and is preferably not engaged in real-time network operations, such as routing. A Darwinian network 100 may have more than one global network evaluator connecting to different edge nodes for reliability or load sharing.

Edge-Node Connectivity

The connectivity of an edge node 110 to selected, or all, core media 120, may be governed by anticipated spatial traffic distributions, traffic composition, topological considerations and operational requirements. For example, if it is determined that a new edge node 110 is intended for data streams of high flow rates, then the edge node need not have a connection to a narrow-band core medium. Details of the topological design of the Darwinian network are not described in the present disclosure.

The edge controller of each edge node 110 is operable to select one of the core media 120 for each signal-transfer request and to communicate with a controller of a core node in a selected core medium 120 to determine a transmission time of the respective signal.

Core Controller

In a core medium 120 that employs core nodes, each switching core node may have its own core controller (not illustrated) which may communicate with edge controllers of edge nodes 110, and possibly with core controllers of other switching core nodes within the same core medium, to schedule the transfer of signals through the core medium.

Global Network Evaluator

Each universal edge node 110 is operable to gauge the core media 120 to which it is connected. The global network evaluator 180, which is preferably connected to one of the edge nodes 110 as illustrated in FIG. 1, receives core-media-measurements from universal edge nodes 110 and provides metrics to enable evaluation and ranking of the core media 120. Global network evaluator 180 primarily performs 'off-line' computations and may, therefore, be centralized. A backup global network evaluator may also subtend to another edge node for reliability and, possibly, load sharing.

Universal Edge Node

A universal edge node is a versatile switching node featuring multiple granularities and interfacing with core media of different types. Regardless of its structure, an edge node requires random-access data buffers which, presently, may only be realized electronically.

Figure 2:
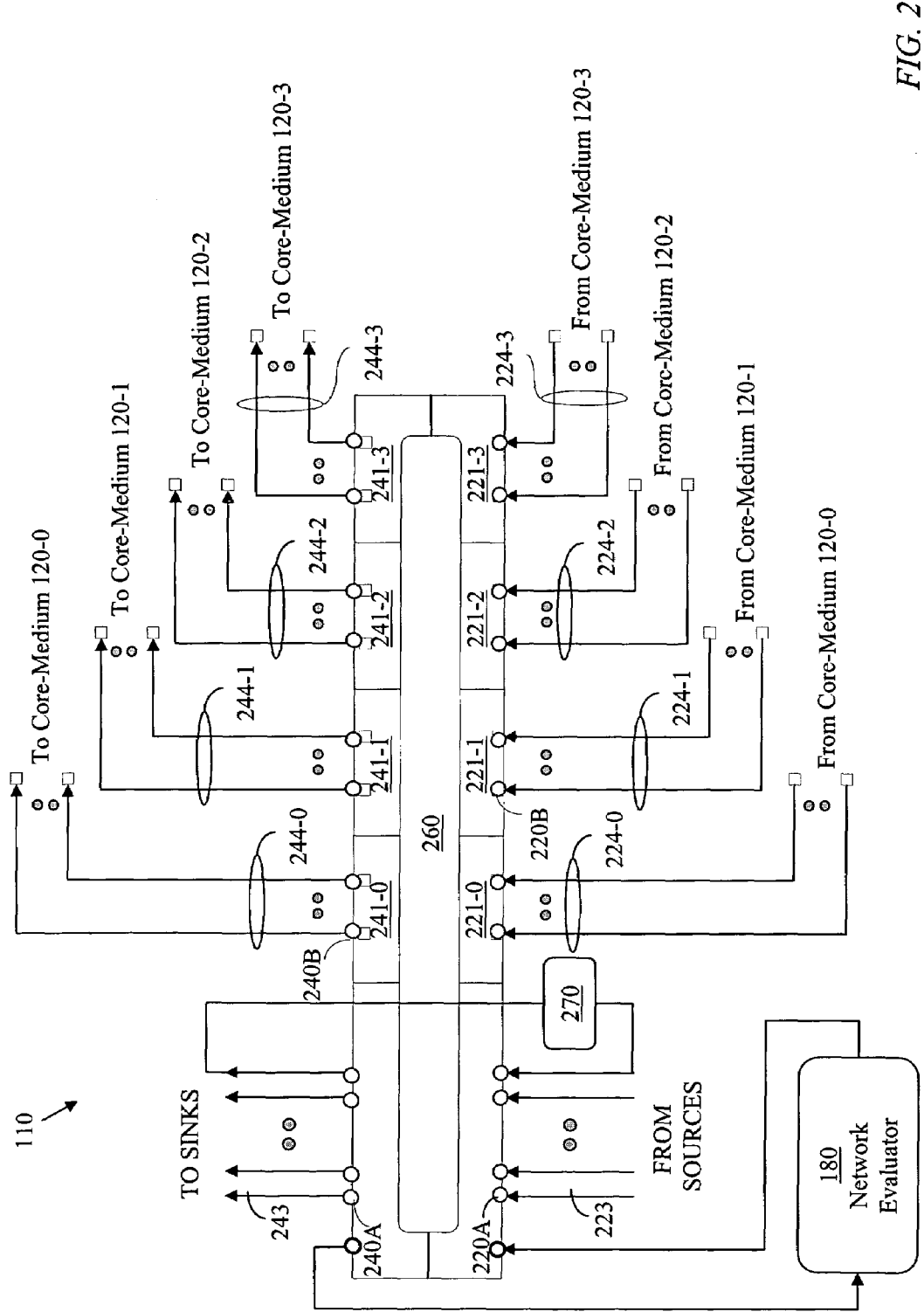
FIG. 2 illustrates an edge node providing interfaces to the four core media of FIG. 1 and hosting a network controller, in accordance with an embodiment of the present invention.

FIG. 2 illustrates a universal edge node 110 adapted for use in the Darwinian Network 100 of FIG. 1. Universal edge node 110 is preferably a multi-grained electronic switching node which includes, at its input side, several input ports 220 and, at its output side, several output ports 240. The input ports communicate with the output ports through an electronic switching fabric 260.

The exemplary universal edge node 110 of FIG. 2 supports traffic sources and sinks, and is adapted to interface with the four core media 120-0, 120-1, 120-2, and 120-3 of FIG. 1. The input ports 220 include ingress ports 220A receiving signals from traffic sources through ingress channels 223, and inbound port 220B arranged in inbound-port groups 221-0, 221-1, 221-2, and 221-3 receiving signals from core media 120-0, 120-1, 120-2, and 120-3 through inbound-channel groups 224-0, 224-1, 224-2, and 224-3 (referenced individually or collectively as 224) respectively. The output ports 240 include egress ports 240A transmitting signals to traffic sinks through egress channels 243 and outbound port 240B arranged into outbound-port groups 241-0, 241-1, 241-2, and 241-3 transmitting signals to core media 120-0, 120-1, 120-2, and 120-3 through outbound-channel groups 244-0, 244-1, 244-2, and 244-3 respectively. Although edge node 110 is illustrated to interface with the four core media of network 100 of FIG. 1, it is understood that the edge node may interface with an arbitrary number of core media, the number and types of interfaces being governed primarily by the edge node dimension.

An input port 220 may be adapted to receive data streams of a specific type; IP (Internet Protocol) data packets for example. Each input port 220 is preferably paired with an output port 240, with which it shares memory and a port controller. Each ingress port 220A receiving data from traffic sources preferably includes a flow-rate-estimation device (not illustrated) adapted to compute flow-rate (bit-rate) requirements for selected data streams in order to meet service-quality requirements. Each outbound port 240B connecting to a bufferless core medium preferably includes a time-locking device (not illustrated) adapted to control data transmission time from the output port in order to meet stringent arrival-time requirements at bufferless core nodes. A time-locking device is disclosed in U.S. Pat. No. 6,570,872 issued to Beshai et al. on May 27, 2003 and titled "Self-configuring distributed switch", the specification of which is incorporated herein by reference.

An edge controller 270 is associated with each edge node 110 and is operable to determine a route set from the edge node to each other edge node. Edge controller 270 is illustrated in FIG. 2 to connect to a selected ingress port 220A and a selected egress port 240A. Other arrangements of accommodating edge controller 270 within the edge node 110 may be considered. A route set includes a description of at least one route traversing at least one of the core media. A route set may include a route from a source edge node to a destination edge node traversing a first core medium from among the core media 120, an intermediate edge node, and a second core medium from among the core media 120. Selected edge nodes (or all of the edge nodes) may participate in exchanging signals aimed at measuring the performance of individual core media. A core-evaluation module (not illustrated) may be associated with the edge controller 270 of each of the selected edge nodes to determine performance indices for core media to which a selected edge node is connected. The core-evaluation module of a given edge node 110 is operable to transmit probing signals to other edge nodes over selected core media 120, and receive probing signals transmitted from other edge nodes. An edge controller 270 may communicate the output of its core evaluation module to a global network evaluator 180 (FIGS. 1 and 2).

The edge node 110 illustrated in FIG. 2 also hosts a network evaluator 180 connecting to an input port 220 and an output port 240. The network evaluator 180 communicates with other edge nodes through the outbound ports 240B and inbound ports 220B of the host edge node.

An edge node 110 receives information signals as well as control signals from data sources subtending to ingress ports 220A. Each ingress port 220A processes the control signals to determine data size and destination information, in addition to other relevant information. The data (the payload) may be assembled into data segments to facilitate internal switching through the switch fabric 260 of the edge node 110.

An edge controller 270 comprises (1) an edge control processor that communicates with the input ports 220 and output ports 240, (2) a device for selecting a route for the information signals (information data) of each of received data streams, (3) a fabric scheduler that includes a time-slot scheduling module which determines a distinct time of transfer for each of a set of data segments, derived from received information data, across the switching fabric, and (4) a flow-rate-allocation device. Edge controller 270 selects a route, from among routes of a route set, for each signal received at each of the ingress ports, and controls the forwarding of each signal received from the ingress ports and each signal received from the inbound port groups. Signals of a common data stream are preferably transmitted along one route. The edge controller 270 receives performance data, from other edge nodes through respective core media, at inbound ports and determines performance indices for the respective core media.

A versatile high capacity edge node that provides flow-rate control and time-locking is described in Applicant's co-pending U.S. patent application Ser. No. 10/025,982, filed Dec. 26, 2001, and titled "Universal Edge Node". The features of such an edge node may be combined with the features of the multi-grained edge node of the above mentioned application Ser. No. 10/983,497 to partially produce edge node 110.

Core-Medium Granularity

A transmission medium may accommodate several modulated carrier signals, each carrying a multiplex of baseband signals, and the portion of the frequency spectrum of the transmission medium allocated for each modulated carrier is called a channel. In other words, the transmission medium may carry several channels, each channel occupying a portion of the total frequency spectrum of the transmission medium. Naturally, the channels occupy non-overlapping portions of the spectrum. In a fiber-optic link, the frequency band allocated to each channel is often referenced with respect to the wavelength of the carrier signal and called a "wavelength channel" or, simply, a wavelength.

If a modulated carrier signal shares a transmission medium with several other carrier signals, forming a multiplex of carrier signals, with each modulated carrier signal carrying several baseband signals, a channel switch may separate individual incoming modulated carrier signals and direct each incoming modulated carrier signal to a designated outgoing transmission medium. A channel switch directly switching modulated carrier signals without resorting to baseband detection is hereinafter called a carrier switch; for example photonic switches are carrier switches.

A core medium 120 (FIG. 1) may include baseband switching core nodes or carrier-switching core nodes; each core node may function as a channel-switching node, coarse time-slot-switching node, burst-switching node, fine time-slot switching node, or a packet switching node.

If, at a switching node, the baseband signals (information signals) within the bandwidth of a modulated carrier signal, such as a modulated optical carrier (often called 'a wavelength' as mentioned above), are to be directed to different output ports of the switching node, the switching node may first demodulate the modulated carrier signal, retrieve the individual baseband signals, and direct each of the retrieved baseband signals to an output port that is associated with the destination of the particular baseband signal. A multiplex of baseband signals received at each output port modulates a carrier signal to be transmitted to a subsequent switch. The process where the baseband signals within a single carrier are detected and routed individually is essentially a baseband switching process, and the switching node performing such a process is herein called a 'baseband switching node'.

Fine granularity in a carrier switch may be realized using a large number of carrier signals, each carrier signal modulated by a baseband signal of a narrow bandwidth. For example, instead of using a multiplex of 16 carriers, each modulated at 10 Gigabits per second, a multiplex of 160 carriers, each modulated at one gigabit per second, may be used. The modulated 160 carrier signals may then be spatially switched to separate the individual carrier signals which would be demodulated only at the receiving end switch. Fine frequency division requires a carrier switch of a large dimension. Another way of realizing fine granularity is to use time-division multiplexing (TDM). Thus, for example, 1024 baseband signals of 10 Mb/s (Megabits per second) each may share a wavelength channel of 10 Gb/s (Gigabits per second) capacity. Exchanging carrier signals among 64 multiplexes of 16 carriers each, for example, requires a fast space switch having 1,024 input ports and 1,024 output ports. A fast modular space switch of this capacity is realizable. However, aligning the TDM frames at the 64 input ports is not assured without the use of input buffers. With the current state of the art, a photonic switch cannot easily include input buffers; there is no practical facility to store optical carrier signals and retrieve them in any desired order. This precludes time switching without some means for coordinating the switching functions at each carrier switch with the switching functions at the preceding and succeeding switches.

Switch Granularity

A switching node of coarse granularity typically has a simpler structure than a switching node of fine granularity. The latter requires a switching fabric of lower latency and a scheduler of higher throughput. For example, a coarse optical switch switching data blocks of 10 microsecond duration each may have a switching latency of 500 nanoseconds resulting in an acceptable capacity waste. Switching latency may force the use of a guard time between successive information signals. A fine optical switch of the same dimension and capacity (same number of ports, same flow-rate per port) but switching data blocks of 200 nanoseconds each requires a switching fabric with 10 nanoseconds latency to reduce the capacity waste to an acceptable level and a scheduler operating at roughly 50 times the speed of a scheduler used for the aforementioned coarse switch.

The simplicity advantage of a coarse switch is more than offset by the fact that a switch of coarse granularity may force the use of multiple hops for a significant proportion of traffic streams, thus significantly increasing the overall cost of a network and degrading its performance.

A packet switch may internally use fixed-size data units which may be scheduled using a predefined data frame that is invisible to the rest of the network. For example, U.S. Pat. No. 6,721,271, issued to Beshai et al. on Apr. 13, 2004, and titled "Rate-controlled multi-class high-capacity packet switch", discloses a packet switch where packets of variable sizes are divided into data segments of predetermined sizes, to facilitate switching within the switch fabric, and a process of reciprocal switching is used to collate data segments of each packet. The switch comprises: a plurality of input modules each operable to receive data packets and divide the packets into data segments; a plurality of output modules; and a switch core operable to selectively switch the data segments to the output modules. An input module sorts the segments into input queues each input queue corresponding to a destination output module, and an output module sorts data segments it receives through the switch core into output queues each output queue corresponding to an input-module origin. Each of the output modules is further operable to assemble data segments into reconstructed data packets without the need to reorder the data segments. At least one output module is operable to detect and remove null data, if any, from the data segments prior to assembling the reconstructed data packets. The scheduler of the packet switch may use a time-frame having a predefined number of time slots for scheduling the transfer of data units from the input modules to the output modules, where each data unit occupies a time slot.

Figure 3:
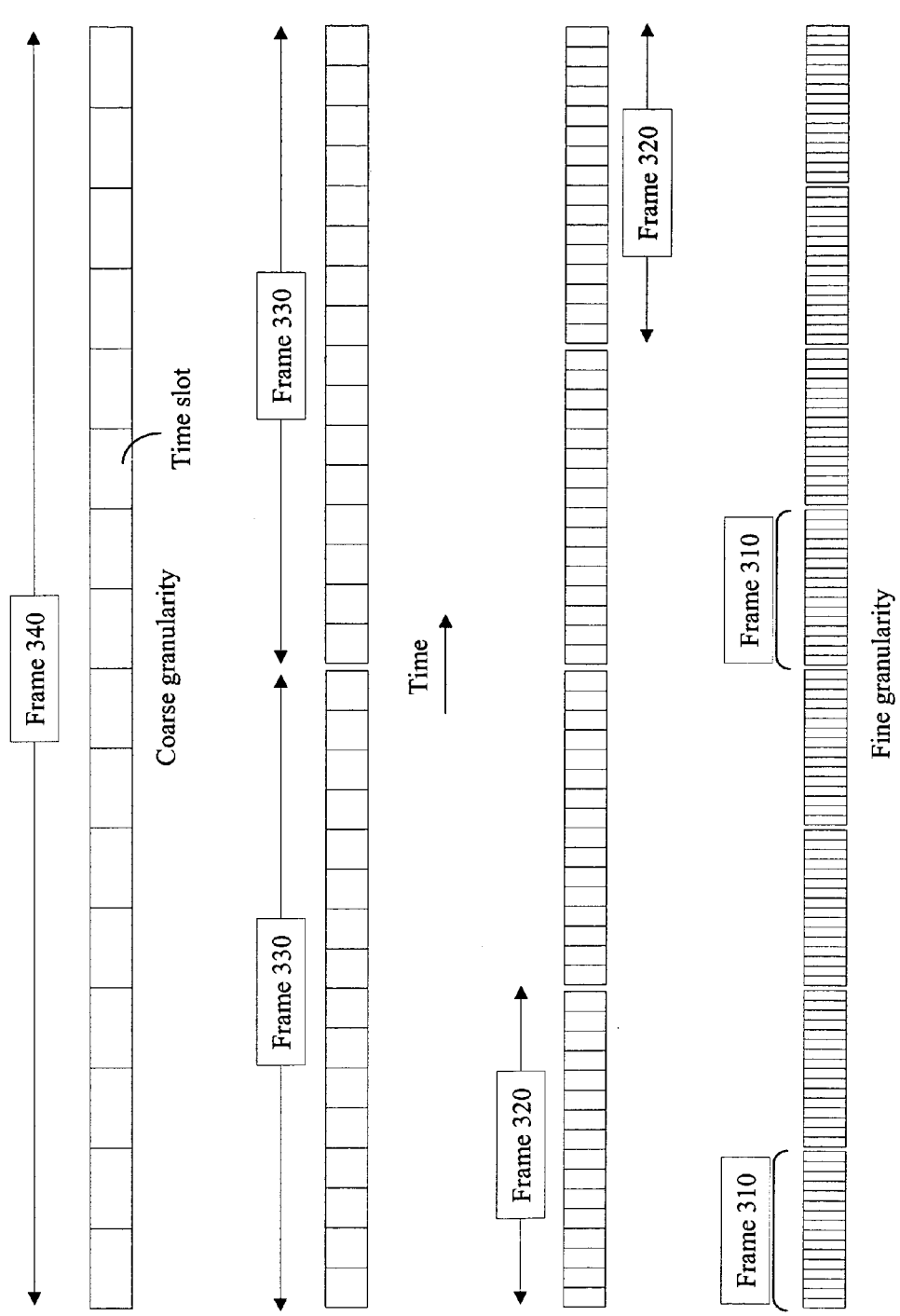
FIG. 3 illustrates a time frame organized to realize multi-granularity in a universal edge node, in accordance with an embodiment of the present invention.

In the universal edge node 110 of FIG. 2, the outbound ports 240B may connect to core media of different granularities and the scheduler may then use time frames of different structures. FIG. 3 illustrates exemplary structures of four time frames for realizing multiple granularities at the output ports 240 (FIG. 2) of a universal edge node 110, using time-frame durations bearing rational relationships to each other. FIG. 3 illustrates four time frames 310, 320, 330, and 340 each having the same number of time slots but with time slot durations of the ratio 1:2:4:8, respectively. Other time-frame structures may be devised for data streams of different granularities.

Scheduling in a Darwinian Network

A first step in establishing a path is to select a core medium 120 that is suitable for a connection specified in a connection request. A path across any core medium may be established by means of control-signal exchanges between an edge node 110 and a controller of a core node within the core medium. Where the core medium is totally passive, using for example static wavelength routers, a path from an originating edge node 110 to a destination edge node 110 may be established by control-signal exchanges between the originating edge node and candidate intermediate edge nodes. Each outbound port 240B (FIG. 2) of an edge node 110 may have a buffer and, therefore, the process of finding a path through the core media 120 and the process of establishing an internal path through the edge node may be temporally decoupled and performed independently.

The core media may operate at distinctly different granularities where data units may be packets of relatively-small sizes (each of the order of one kilobyte for example) or data burst of larger sizes (each of the order of one megabyte for example). The switching fabric of an edge node may therefore be adapted to switch data blocks of widely varying sizes. Alternatively, the switching fabric of the edge node 110 may switch data units of equal sizes which may be assembled at each outbound port into data blocks of arbitrary sizes according to the requirements of the core medium to which the outbound port connects as will be described with reference to FIG. 4.

An edge node 110 of a relatively-small dimension, for example 16×16 may use a common-memory switch fabric which requires minimal scheduling effort. However, an edge node 110 of large dimension may use a time-shared space-switch fabric with input ports provided with buffers and, preferably, output ports also provided with buffers. To provide fine granularity, a scheduling time frame including a large number of time slots, 8192 for example, may be used. For a switch fabric of large dimension, for example 4096× 4096, and a large number of time slots per scheduling frame, a high speed scheduler would be required to determine the transfer time of each data unit across the space switch. Several high-speed schedulers are known in the art. For example, Applicant's U.S. patent application Ser. No. 11/002,580, filed on Dec. 2, 2004 and titled "High-speed scheduling apparatus for a switching node" discloses a scheduling apparatus comprising multiple schedulers which are individually associated with non-intersecting control domains. The control domains may be dynamically selected and assigned to schedulers in a manner that achieves a high throughput gain.

The outbound ports 240B of an edge node 110 (FIG. 2) may transmit data blocks of distinctly different sizes to the core media 120. However, the input ports of edge node 110 may internally transfer data units of equal size to the output ports and each output port may form data blocks each data block comprising multiple data units possibly received from different input ports. For example, consider a specific core medium 120 comprising optical nodes switching data blocks of 10 microseconds each, with the size of each data unit within each of the edge nodes connecting to the specific core medium being 1024 bits. If each of the channels connecting the edge nodes to the specific core medium 120 carries data at a rate of 10 Gb/s (gigabits per second), the duration of a data unit would be approximately 0.1 microseconds and a data block switched in the core may contain 100 data units.

Figure 4:
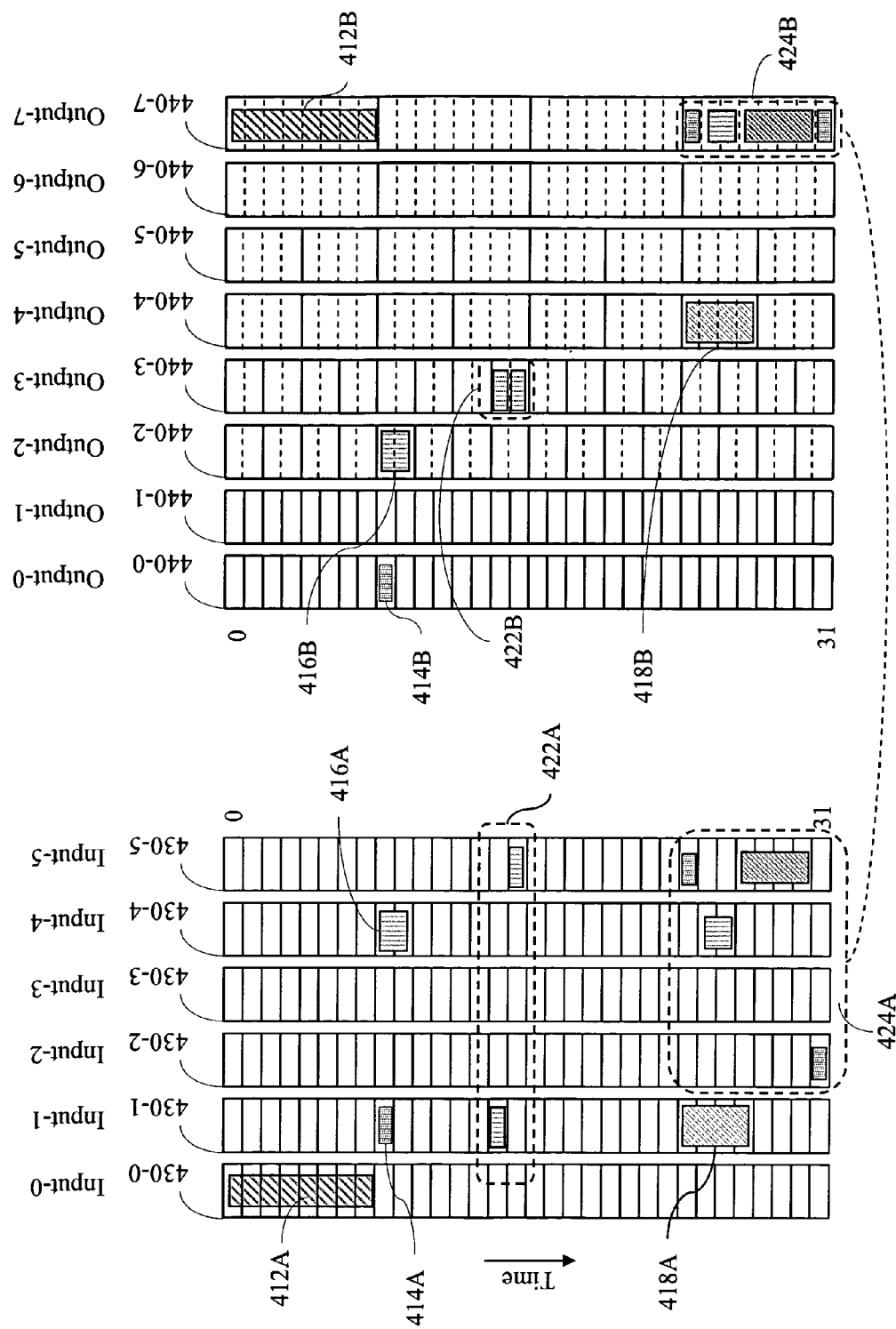
FIG. 4 illustrates matrices used by an edge-node controller for scheduling transfer of data to core media, in accordance with an embodiment of the present invention.

To enable scheduling transfer of data to multi-grained output ports, edge controller 270 may use input-vacancy vectors 430 and output-vacancy vectors 440 as illustrated in FIG. 4. A switch fabric of a relatively small dimension, 16 input ports and 16 output ports, is used for ease of illustration. An input port and an output port may be reserved for connecting to an edge controller 270 (FIG. 2). Another input port and another output port may also be reserved for connecting a network evaluator 180 (FIGS. 1 and 2). The remaining 14 input ports may include six ingress ports 220A and eight inbound ports 220B, and the remaining 14 output ports may include six egress ports 240A and eight outbound ports 240B. It is noted that only a small number of edge nodes, preferably not exceeding two, may support network evaluators. The division of input ports between ingress ports and inbound ports, as well as the division of output ports into egress ports and outbound ports may vary from one edge node to another depending on the spatial distribution of traffic. As mentioned above, a switch fabric of such a small dimension is preferably implemented as a simple common-memory switch which does not require the use of the vacancy vectors 430/440 for scheduling. In this example, a set of 14 input-vacancy vectors 430 and a set of 14 output-vacancy vectors 440 would be required for the scheduling process. FIG. 4 illustrates only a set of six input-vacancy vectors, arbitrarily labeled 430-0 to 430-5, each input-vacancy vector corresponding to an ingress port 220A (FIG. 2) and only a set 440 of eight output-vacancy vectors, arbitrarily labeled 440-0 to 440-7, each output-vacancy vector corresponding to an outbound port 240B of the 16×16 switch fabric (of which two input ports and two output ports are reserved for controllers). The input-vacancy vectors for inbound ports 220B and the output-vacancy vectors for egress ports 240A have been omitted for clarity of the figure but it is understood that they are essential to the scheduling process to accommodate terminating switching from inbound ports 220B to egress ports 240A and potential switching from ingress ports 220A to egress ports 240A or from inbound ports 220B to outbound ports 240B within the edge node 110. The six ingress ports of the 16×16 switch fabric are labeled input-0 to input-5 and the eight outbound ports are conveniently labeled output-0 to output-7. Each ingress port may receive data of arbitrary structure and form data units each of a predefined size. Null-padding may be used where a data unit is incomplete. The outbound ports 240B are divided into four outbound groups each having two outbound ports (FIG. 2). The outbound ports of each outbound group transmit to a respective core medium data blocks of the same size. The minimum size of a data block is one data unit, however defined. The sizes of the data blocks used for the four outbound groups {output-0, output-1}, {output-2, output-3}, {output-4, output-5}, and {output-6, output-7} are one data unit, two data units, four data units, and eight data units respectively. The input-vacancy vectors 430 and output-vacancy vectors 440 are used to schedule data transfer over a scheduling time frame comprising an integer number of time slots, each time slot corresponding to the duration of a data unit. With the above selection of block sizes, it is preferable that the ratio of the duration of the scheduling frame to the duration of a time-slot be a power of two. In the example of FIG. 4, the duration of a scheduling frame is 32 time slots. In an actual edge node 110, the number of time slots per time frame may be of the order of 4096. With a time slot of 40 nanoseconds duration, the duration of the scheduling frame would be of the order of 160 microseconds. Each input-vacancy vector 430 or output-vacancy vector 440 has a number of entries, indicated as entry-0 to entry-31, equal to the number of time slots per scheduling frame. An entry in an input-vacancy vector 430 may be set at '0' if the corresponding input-port is free during the time slot corresponding to the entry, otherwise, the entry is set to equal 1. Likewise, an entry in an output-vacancy vector 440 may be set to '0' if the corresponding output port is free during the time slot corresponding to the entry, and is set to equal '1' otherwise.

In the example of FIG. 4, four data blocks are formed at ingress ports 220A (FIG. 2), each matching the granularity of a respective outbound port 240B. Where a data block comprises two or more data units, the data block is scheduled to occupy consecutive entries in the input-vacancy vectors 430 and the output-vacancy vectors 440. The scheduled time slots for the four data blocks are indicated in vectors 430 and 440 by entries {412A, 412B}, {414A, 414B}, {416A, 416B}, and {418A, 418B}, respectively. Entries 412A and 412B correspond to input-0 and output-7, entries 414A and 414B correspond to input-1 and output-0, entries 416A and 416B correspond to input-4 and output-2, and entries 418A and 418B correspond to input-1 and output-4. FIG. 4 also illustrates two data blocks formed at outbound ports, each including data units from different ingress ports. A data block occupying entries 422B in output-vacancy vector 440-3 comprises two data units, one from input-1 and the other from input-5, occupying entries indicated as 422A in respective input-vacancy vectors 430. A data block occupying entries 424B in output-vacancy vector 440-7 comprises data units from input-2, input-4, and input-5, occupying entries indicated as 424A in respective input-vacancy vectors 430.

Core-Media Examples

The core media 120 (FIG. 1) may include both legacy core media and new core media. A legacy core medium may include packet routers directly interconnected by wavelength channels or packet routers interconnected through electronic cross-connectors such as SONET switches. New core media may include static connectors, wavelength-division-multiplexed core switches or fast-switching optical core nodes arranged in one-dimensional or two-dimensional structures. Some examples of new core media are illustrated below.

First-Order Mesh

Figure 5:
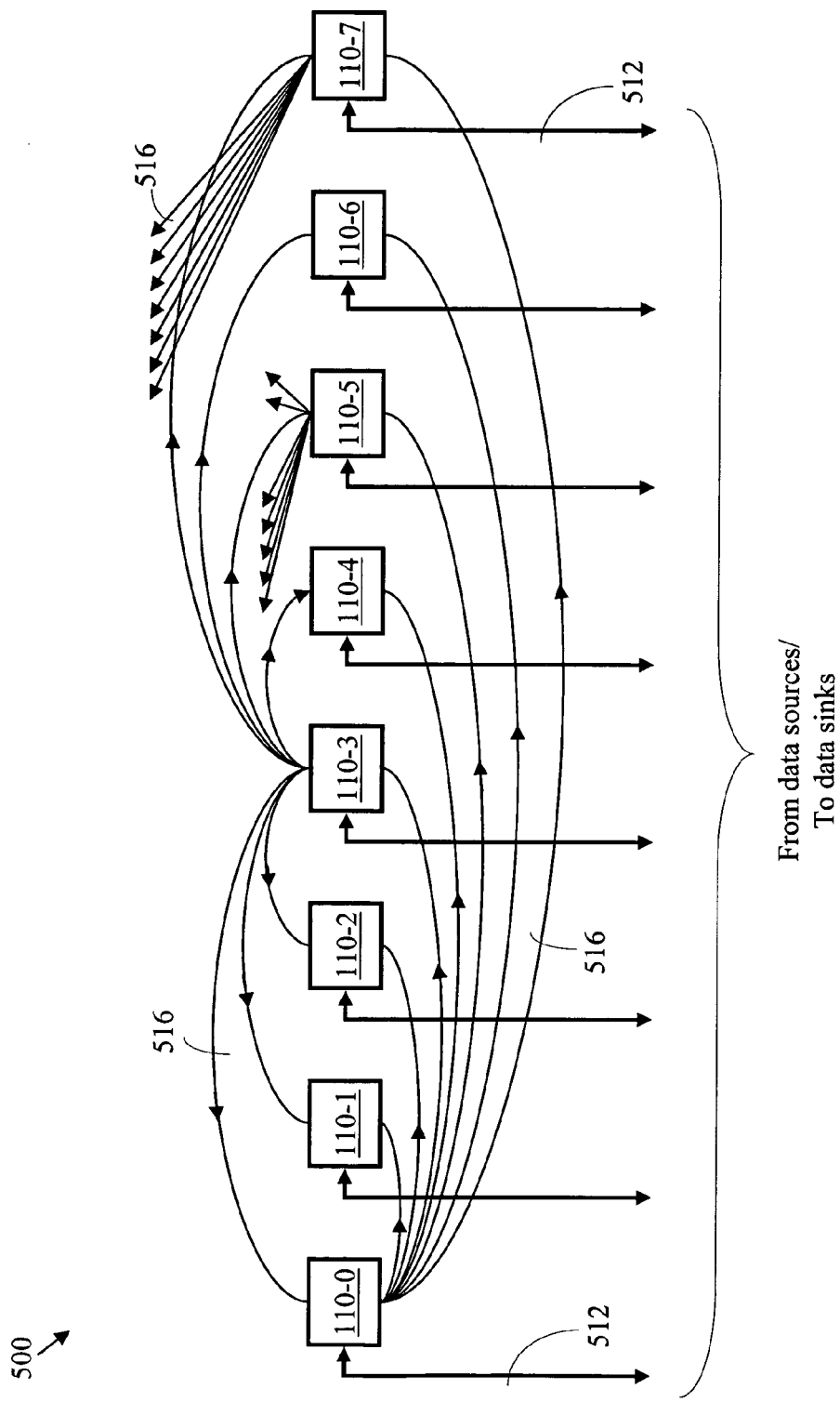
FIG. 5 illustrates a core medium, within the network of FIG. 1, having a first-order mesh structure.
Figure 6:
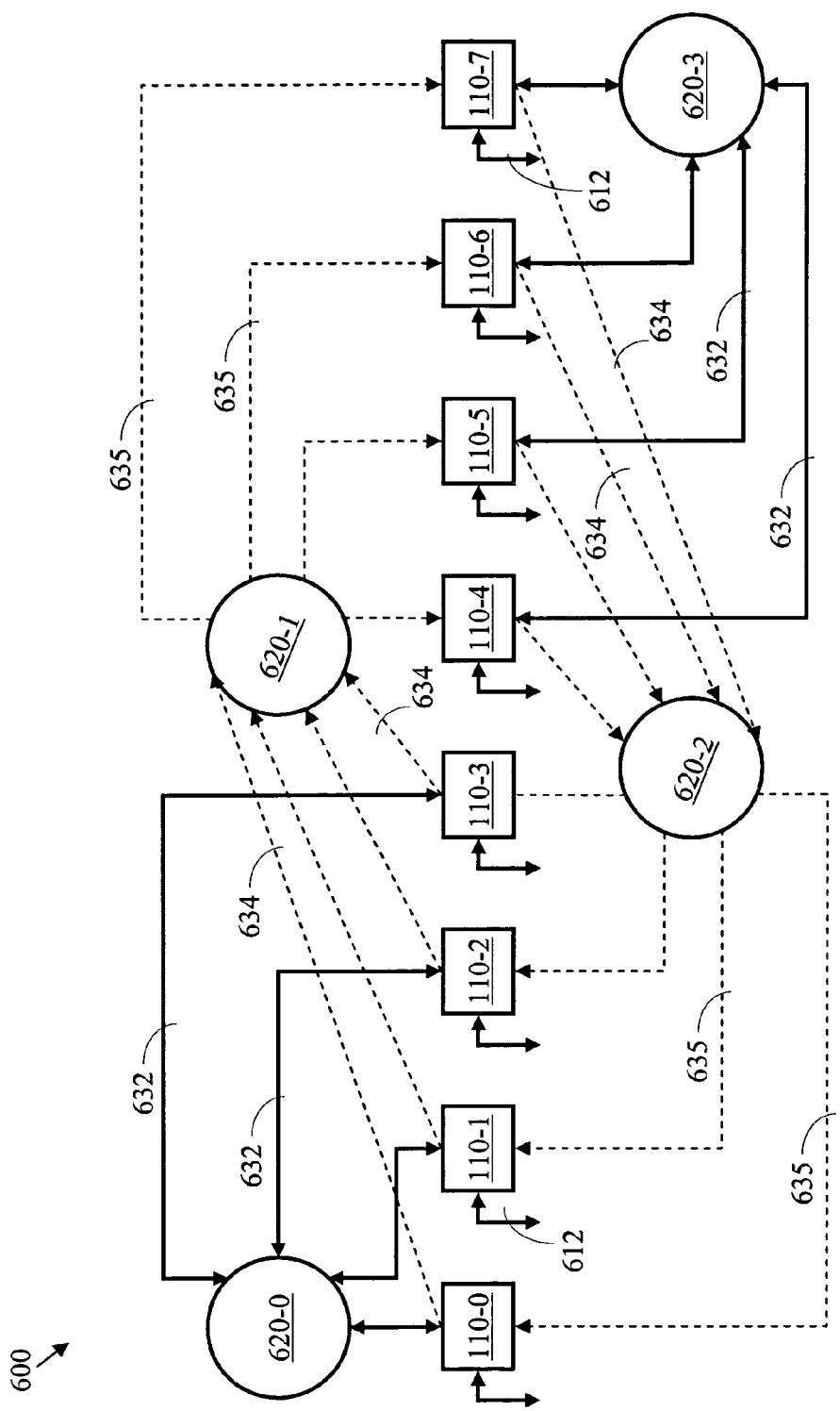
FIG. 6 illustrates a core medium, within the network of FIG. 1, having a mesh structure using wavelength routers.

As illustrated in FIG. 5, a core medium may comprise static links 516 interconnecting edge nodes 110 to form a first-order mesh structure (i.e., a full mesh) 500. Each edge node 110 connects to subtending data sources and data sinks through a bidirectional link 512 and connects to each other edge node through a link 516. Only links from edge node 110-0 to each other edge node (110-1, 110-2, 110-3, 110-4, 110-5, 110-6 and, 110-7) and links from edge node 110-3 to each other edge node (110-0, 110-1, 110-2, 110-4, 110-5, 110-6, and 110-7), are illustrated. Each other edge node 110 is similarly linked to edge nodes thus forming a full mesh. The full mesh of FIG. 5 may be realized using wavelength routers, as illustrated in FIG. 6, to exploit wavelength-multiplexing economy. The dual ports of each edge node 110 in network 600 of FIG. 6 may be divided into outer dual ports, interfacing with data sources and sinks through links 612, and inner dual ports connecting to the wavelength routers 620. The number of edge nodes that may be interconnected in a first-order mesh is limited by the number of inner dual ports, of each edge node, designated for connection to the other edge nodes to form the full mesh. For example, a full mesh of 256 edge nodes may be formed if each edge node has 255 inner dual ports connecting to other edge nodes through the wavelength routers 620.

When the number of edge nodes 110 exceeds the number than can be accommodated by a single wavelength router 620, a channel connection from each edge node to each other edge node (i.e., a full mesh) may still be realized using multiple wavelength routers collectively functioning as a single wavelength router of a larger dimension than any constituent wavelength router. In the example of Network 600, there are eight edge nodes 110-0 to 110-7 (referenced individually or collectively as 110) and a full mesh is realized using four wavelength routers 620-0, 620-1, 620-2, and 620-3. The edge nodes are divided into two groups of four edge nodes each; 110-0 to 110-3 and 110-4 to 110-7. Wavelength router 620-0 interconnects edge nodes 110-0 to 110-3, and wavelength router 620-3 interconnects edge nodes 110-4 to 110-7, through dual multi-channel links 632. Wavelength router 622-1 connects the four edge nodes (110-0 to 110-3) of the first group to the four edge nodes (110-4 to 110-7) of the second group, and wavelength router 620-2 connects the four edge nodes (110-4 to 110-7) of the second group to the four edge nodes (110-0 to 110-3) of the first group, through multi-channel links 634 (uplinks) and 635 (downlinks). Each dual multi-channel link 632 may have three channels in each direction while each multi-channel link 634 or 635 may have four channels to realize a full mesh. If the number of edge nodes is 256, and the maximum dimension of a wavelength router is 32×32, i.e., the wavelength router can accommodate 32 input links each carrying 32 channels and 32 output links each carrying 32 channels, then 64 wavelength routers may be used to realized a full mesh of dimension 256×256. With a much larger number of edge nodes, 100,000 for example, it may be impractical to provide a full mesh and a partial second-order mesh may be employed as described below with reference to FIGS. 7 and 8.

Higher-Order Mesh

A core medium may also comprise static links interconnecting edge nodes 110 to form a higher-order mesh structure. The edge nodes 110 of a network may be arranged in a recursive structure where first-order groups are interconnected to form second-order groups; second-order groups may be interconnected to form third-order groups; and so on. Each edge node 110 individually constitutes a zero-order group. A first-order group is formed by connecting a number of zero-order groups (i.e., a number of edge nodes) using a static or agile core node. The size of a first-order group is determined by the dimension of the core node. For example, a core node of dimension 64×64 enables the formation of a first-order group of 64 edge nodes. A second-order group may then be formed by connecting a number of first-order groups using static or agile core nodes. Each edge node in a first-order group has at least a single-channel path to an edge node within each other first-order group. The channel is routed through a core node and the maximum number of first-order groups that can form a second-order group is determined by the dimension of the core node used.

Using a core node of dimension $n_j \times n_j$ to form a $j^{th}$-order group from $(j-1)^{th}$-order groups so that a $j^{th}$-order group comprises at most $n_j$ groups of order $(j-1)$, the maximum number of edge nodes in the network would be $$\prod_{j=1}^{J} n_j$$

where J is the highest connectivity order. For example, using wavelength routers of dimension 256×256 ($n_j$=256) as core nodes, a second-order mesh accommodating 65,536 edge nodes 110 may be realized. It is noted that a wavelength router of dimension 256×256 may be realized using a number of wavelength routers of smaller dimension as described above with reference to FIG. 6.

In FIGS. 7-11, described below, connections between the edge nodes and respective data sources and sinks are omitted to simplify the drawings.

Figure 7:
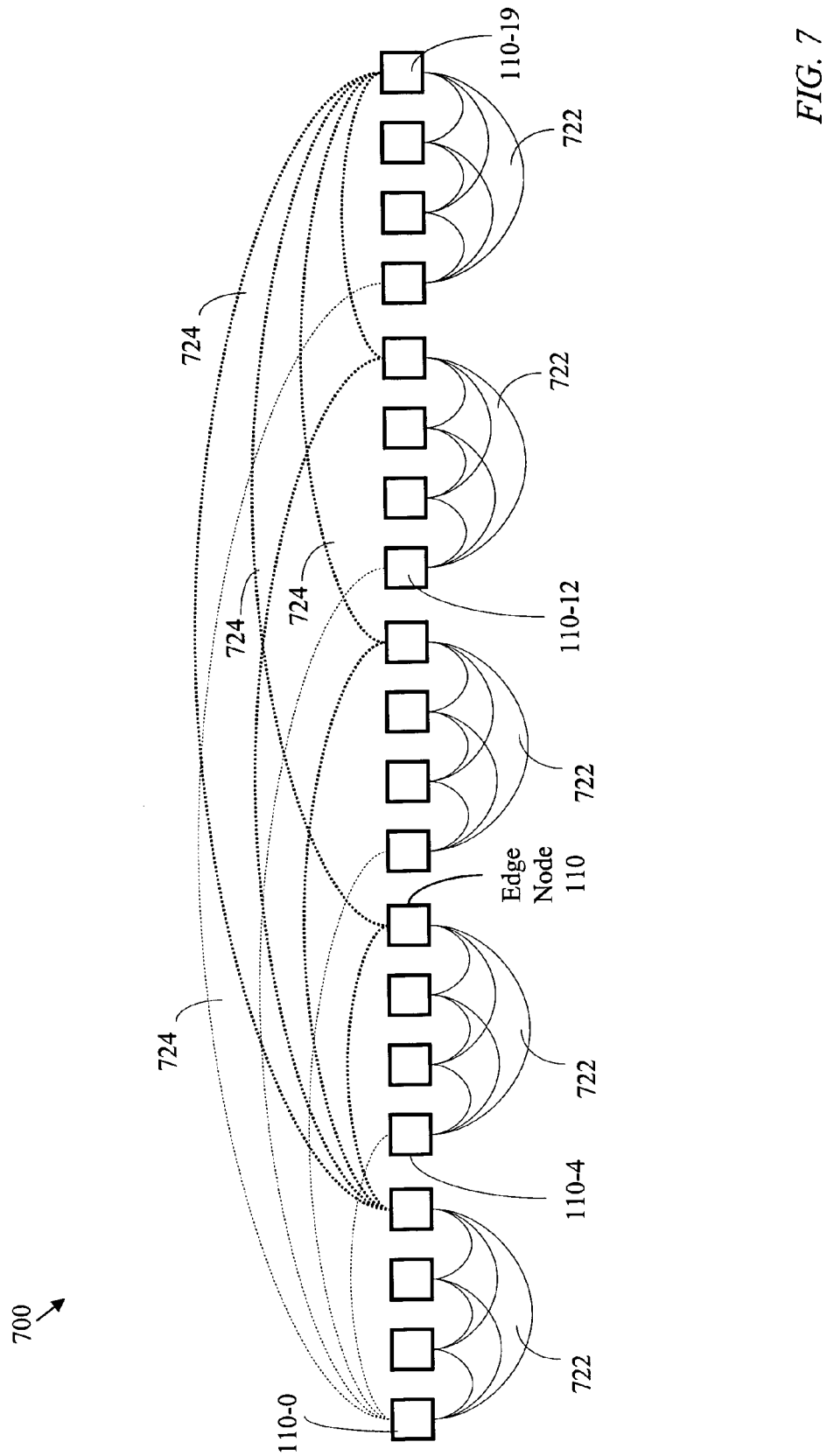
FIG. 7 illustrates a core medium, within the network of FIG. 1, having a second-order mesh structure.
Figure 8:
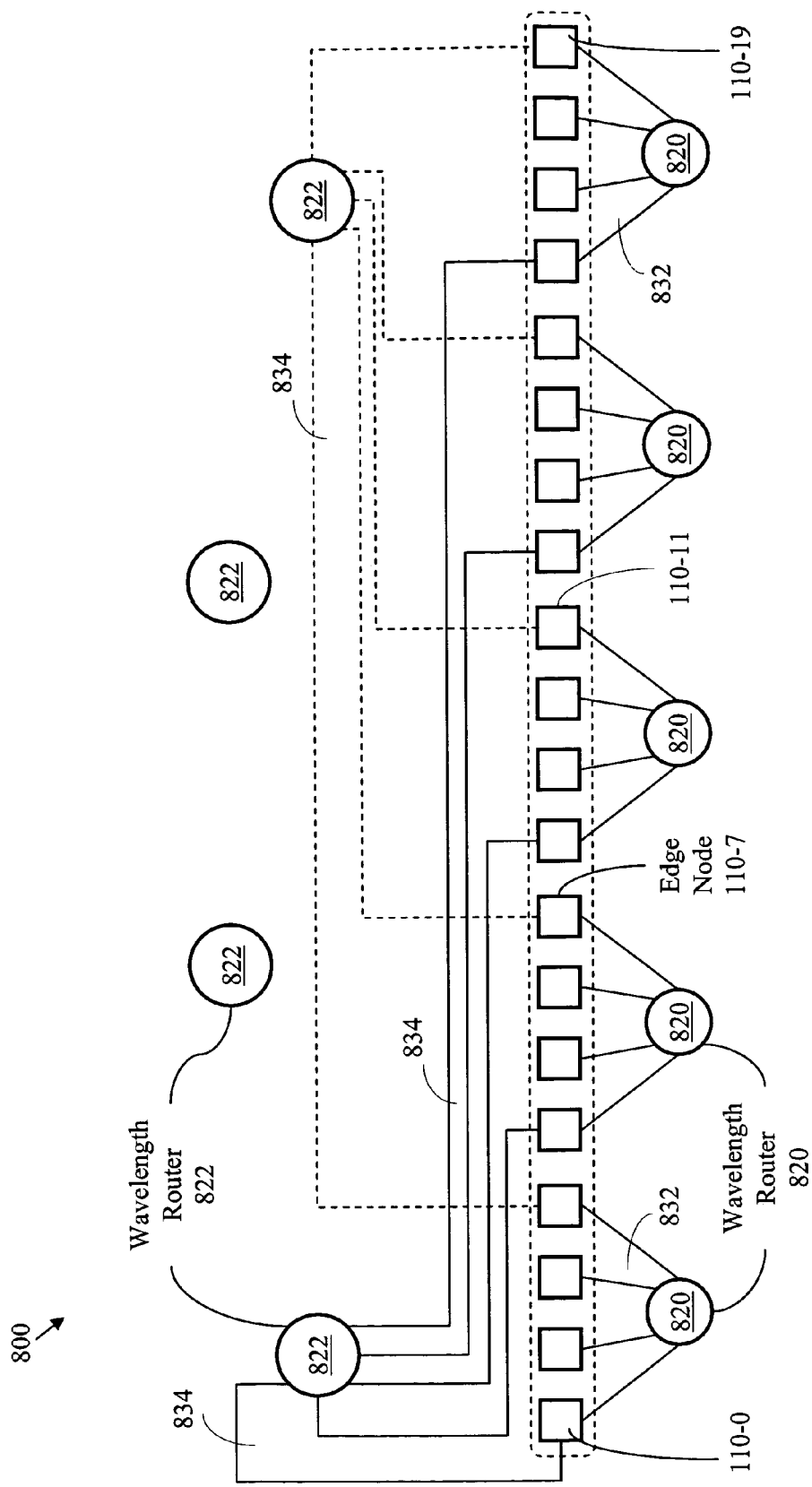
FIG. 8 illustrates a core medium, within the network of FIG. 1, having a second-order mesh structure and using wavelength routers.

FIG. 7 illustrates 20 edge nodes 110-0 to 110-19 (referenced individually or collectively as 110) interconnected to form a second-order mesh 700 where each edge node 110 connects to each of selected edge nodes through a link comprising at least one wavelength channel. The 20 edge nodes are divided into five groups each group having four edge nodes 110. The edge nodes within a group are interconnected by links 722. Each edge node in a group is connected to one edge node from each other group through links 724. A link 722 or 724 may include only one channel. Using fiber links each carrying multiple wavelength channels, static wavelength routers may be used to distribute the wavelength channels as illustrated in FIG. 8. In the second-order mesh network 800 of FIG. 8, the edge nodes 110 are also organized in groups and each edge node 110 connects to an intra-group wavelength router 820 through a multi-channel link 832 and to an inter-group wavelength router 822 through a multi-channel link 834. The core medium may start with static optical nodes 820 and 822, such as Arrayed Waveguide Grating (AWG) wavelength routers, and graduate to optical switches operated in a channel-switching mode, then to fast optical switches operated in a time-division-multiplexing mode.

The core nodes of mesh network 800 would typically be of moderate capacities. The interconnection pattern attempts to maximize the proportion of direct connections. First-order connectivity provides intra-group connectivity through core nodes 820. Second-order connectivity provides a connection from each edge node in a first-order edge-node group to an edge node in each other first-order edge-node group through a core node 822. Likewise, extension to higher-order connectivity can be carried out. An auxiliary connectivity may further provide other channels from some edge nodes in an edge-node group to edge nodes in other edge-node groups. In a network comprising a small number of edge nodes and having a high traffic density (the traffic density being the total external traffic divided by the number of node pairs), the auxiliary connectivity may be extended with time until all node-pairs are directly connected, thus creating a full mush. Each connectivity order implies the existence of lower connectivity orders. Thus, $j^{th}$ order connectivity, j>1, implies the existence of first-order to $(j-1)^{th}$ order connectivity.

Thus, second-order mesh network 800 is structured to exploit current and evolving capabilities of electronic processing and photonic switching while observing known technological limitations such as the latency and scalability of optical switches. As the optical-switching technology develops, fast-switching optical core nodes may be deployed. This, however, need not result in replacement of initially deployed wavelength routers, because the data-traffic level is likely to grow as advanced optical-switching devices become available and the already installed static-core base would be well utilized.

Composite Star Network

Figure 9:
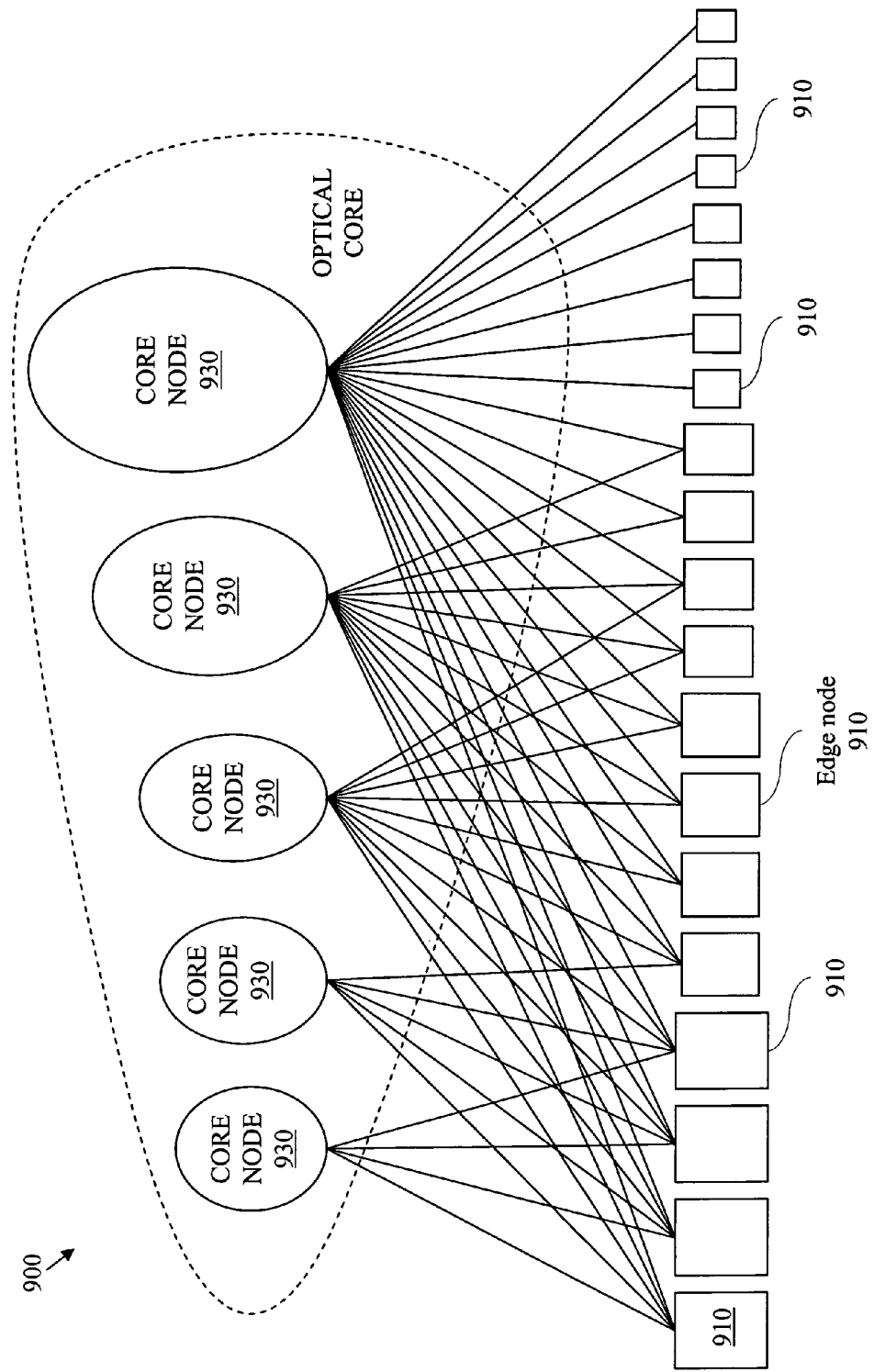
FIG. 9 illustrates an example of a core medium, within the network of FIG. 1, having a composite-star structure.

FIG. 9 illustrates a core medium comprising independent fast optical core switches 930. To form a fully connected network, a moderate number, M, of edge nodes 110 can be interconnected by a single core node to form a basic star network, which has coverage limitation. For wide coverage, a composite star network 900 may be configured to interconnect the M edge nodes 110 by a number of core nodes 930 to form paths of adaptive capacity from each edge node to each other edge node. The number M is limited by the number of ports of the core node 930 of largest dimension. A path from a source edge node 110 to a sink edge node 110 consists of a channel from the source edge node 110 to a core node 930 and a channel from the core node 930 to the sink edge node 110.

The above composite star-like structure, which enables connection from a source node to a sink node through a single core node 930, is limited by the dimension of the core nodes 930; the number of edge nodes that can be supported by a composite star network is limited by the dimension of the largest core node. The number M can be of the order of 1000, if the core node is an electronic space switch, or (currently) a relatively smaller number if the core node is an optical space switch.

The composite-star network is described in detail in the aforementioned U.S. Pat. No. 6,570,872, issued to Beshai et al. on May 27, 2003, and titled "Self-Configuring Distributed Switch". To realize higher capacity, a multi-dimensional structure can be used.

Lattice Interconnection of Edge Nodes

Figure 10:
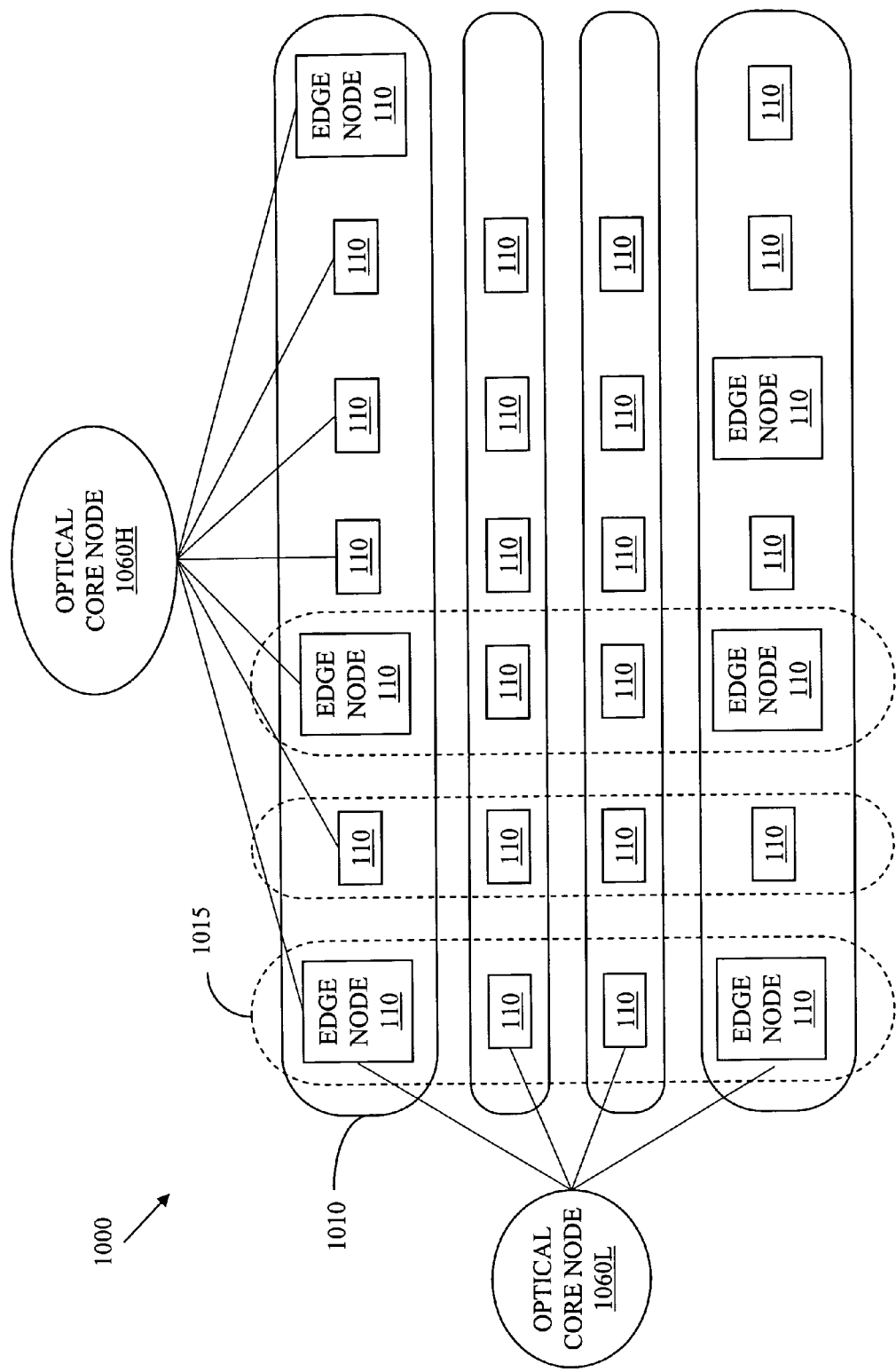
FIG. 10 illustrates a core medium, within the network of FIG. 1, interconnecting edge nodes to form a two-dimensional non-uniform composite-star structure.

FIG. 10 illustrates a network 1000 having edge nodes 110 interconnected by a core medium that comprises independent core nodes 1060. Network 1000 is described in Applicant's U.S. patent application Ser. No. 10/180,080, filed Jun. 27, 2002, and titled "Irregular two-dimensional wide-coverage network", the specification of which is incorporated herein by reference.

The edge nodes 110 are arranged in a two-dimensional structure which comprises several one-dimensional composite-star networks of the type illustrated in FIG. 9. In general, the constituent one dimensional composite-star networks may be of irregular structures. The exemplary two-dimensional irregular composite star network 1000 includes high capacity edge nodes and low capacity edge nodes 110. The edge nodes 110 in exemplary network 1000 are logically arranged in four non-uniform primary composite-star networks 1010 each having several edge nodes 110 interconnected by an optical core node 1060H, only one of the four optical core nodes 1060H is illustrated. Three lateral sets of high capacity edge nodes 110 are formed and the high capacity edge nodes 110 of each set are then interconnected through a lateral optical core node 1060L, thus forming three lateral composite-star networks 1015. Each of the illustrated edge nodes has one of two distinctly-different dimensions, with an edge node of a relatively high dimension having a sufficient number of links to enable interconnection with two optical core nodes 1060H, 1060L. If the edge nodes 110 of a set are of equal, or comparable, capacity, then the formed lateral composite-star networks 1015 can be uniform. The illustrated lateral composite star networks 1015 are uniform.

In the exemplary two-dimensional irregular composite star network 1000, each high capacity edge node 110 is a member of two composite-star networks 1010, 1015. The selection of edge nodes to be associated with a composite-star network 1010, 1015 can be based on expected mutual traffic among the edge nodes.

Each low capacity edge node 110 belongs only to one of the primary non-uniform composite-star networks 1010 and has links to and from one of the primary optical core nodes 1060H. A high capacity edge node 110 belongs to one of the primary non-uniform composite-star networks 1010 and one of the lateral uniform composite-star networks 1015 and has links to and from one of the primary optical core nodes 1060H and one of the lateral optical core nodes 1060L. The lattice structure interconnecting the plurality of primary non-uniform composite-star networks enables high scalability.

Lattice Interconnection of Core Nodes

Figure 11:
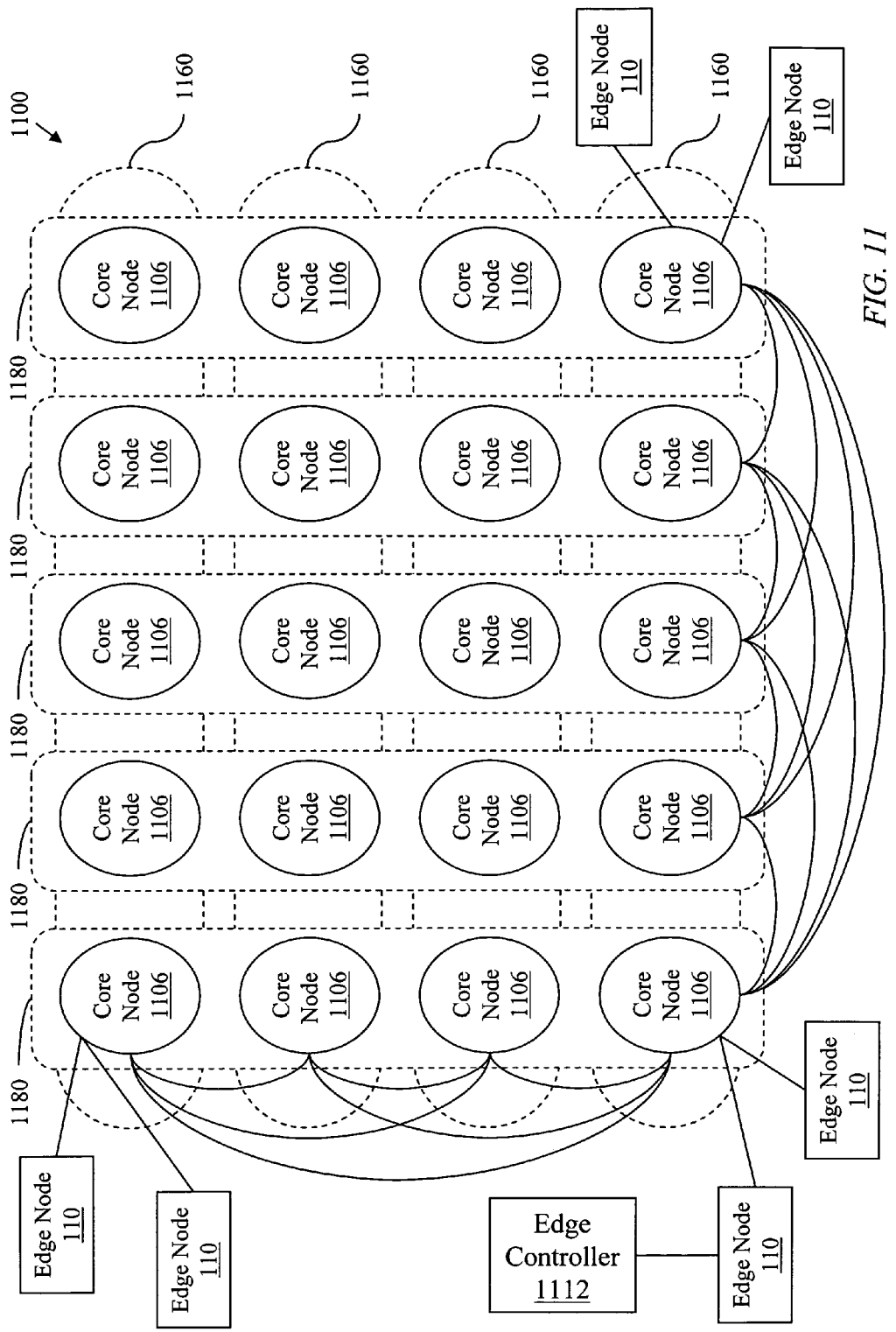
FIG. 11 illustrates a core medium, within the network of FIG. 1, of two-dimensional lattice structure.

FIG. 11 illustrates an optical-core lattice network 1100 described in Applicant's U.S. patent application Ser. No. 10/290,314 filed on Nov. 8, 2002, and titled "Hybrid fine-coarse carrier switching", the specification of which is incorporated herein by reference. The optical core medium is defined by N primary networks 1160 wherein the core nodes connect to each other directly. Each of the N primary networks 1160 includes a number of core nodes 1106. A core node 1106 is a fast-switching optical node of fine granularity. A number of edge nodes 110 subtend from each of the core nodes 1106. A few exemplary edge nodes 110 and an exemplary edge controller 1112 are illustrated in FIG. 11. The core nodes 1106 of a given primary network 1160 are connected directly to each other as illustrated in the lowermost primary network 1160 of FIG. 11.

To form a lattice, secondary networks 1180 are also formed. To form a given secondary network 1180, one core node 1106 from each primary network 1160 may be designated as part of the given secondary network 1180 and connected to each other core node 1106 in the given secondary network 1180. Connections between the core nodes 1106 are shown for the leftmost secondary network 1180 and similar connections are understood to be present in the remaining secondary networks 1180.

At least one secondary network 1180 is formed by interconnecting a core node 1106 from each of the N primary networks 1160. FIG. 11 illustrates a "full" lattice network having M secondary networks 1180, where M is the number of core nodes 1106 in each of the primary networks 1160. Each core node 1106 belongs to one primary network 1160 and one secondary network 1180. In the illustrated example, M=5 and N=4.

With M=12 and N=10, for example, and using core nodes 1106 having 1,024 input ports and 1,024 output ports each, the input ports of a core node may be divided into 352 inbound ports (11 WDM links of 32 channels each) receiving from (M−1) core nodes belonging to a primary network 1160, 288 inbound ports (9 WDM links of 32 channels each) receiving from (N−1) core nodes of a secondary network 1180, with the remaining 384 input ports receiving from edge nodes 110. The output ports of the core node would be likewise divided into 352 outbound ports transmitting to (M−1) core nodes belonging to a primary network 1160, 288 outbound ports transmitting to (N−1) core nodes of a secondary network 1180, with the remaining 384 output ports transmitting to edge nodes 110. The total capacity of a lattice network is found by multiplying the number of core nodes 1106 (M×N=120) by the number of inlet ports (384) and by the bit rate capacity of the inter-core node channels. The capacity of a channel connecting any two core nodes is herein considered to be equal to the capacity of a port of a core node, all core-node ports having the same capacity. For this example, consider the bit rate capacity of the inter-core node channels to be 10 Gb/s, giving a total access capacity of $120 \times 384 \times 10 \times 10^9 = 460.8$ Tb/s (terabits per second). The access capacity is the capacity available to the data sources as mentioned earlier.

Comparison of Selected Core Media

FIGS. 5-11 illustrate exemplary core media any of which may be used in the Darwinian network of FIG. 1. The core medium of the first-order mesh network 500 of FIG. 5 is passive, comprising static links 516 interconnecting edge nodes 110. The core medium of the first-order mesh network 600 of FIG. 6 is also passive; comprising wavelength routers 620 and WDM links 632/634/635 connecting the wavelength routers to the edge nodes 110. The core medium of second-order mesh network 700 of FIG. 7 is passive, comprising static inter-nodal links 722/724. The core medium of second-order mesh network 800 of FIG. 8 comprises wavelength routers 820/822 and WDM links 832/834 connecting the wavelength routers 822 to the edge nodes. The core medium of composite-star network 900 comprises fast-switching optical core nodes 930 and links connecting the fast-switching optical core nodes 930 to the edge nodes 110. The core medium of lattice network 1000 of FIG. 10 comprises fast-switching optical core nodes 1060 and links connecting the fast-switching optical core nodes to the edge nodes 110. The core medium of lattice network 1100 of FIG. 11 comprises fast-switching optical core nodes 1106 arranged in a matrix structure, links interconnecting the core nodes 1106 and links connecting each core node to at least one of edge nodes 110. The core nodes of each row of the matrix are interlinked and the core nodes of each column are interlinked. Thus, each optical core node 1106 is a member of a row and a column.

The core media of networks 600 (FIG. 6) and 800 (FIG. 8) may be the easiest to realize, with the latter, 800, offering scalability to very high capacities, in the order of hundreds of petabits per second ($10^{15}$ bits/second), and very wide geographic coverage. With a static optical core, both networks, 600 and 800, operate without the need for time coordination between the core nodes 620 or 820/822 and the edge nodes 110. Networks 600 or 800 are therefore prime candidates for early introduction in a Darwinian network. As fast photonic switching becomes economical and reliable, the core media of networks 900 (FIG. 9), 1000 (FIG. 10), and 1100 (FIG. 11) may gradually be incorporated in the Darwinian network.

Structural Efficiency of Core Media

The ratio of the access capacity (the outer capacity) of a network to its inner capacity may be used as a measure of network efficiency. A low ratio is generally indicative of an inefficient network. The access capacity of a network is the total capacity of the access ports of the network and the inner capacity is the total capacity of the inner ports of the network. The access capacity is the capacity available to network users. In an ideal network, the ratio of access capacity to inner capacity is close to one. The structural efficiency of the entire network may be determined from topology information. Determining the structural efficiency of individual core media would be based on aggregate capacities of core-node ports.

Network Measurements

The use of measurements to manage telecommunications networks has been a common practice for decades. Traditionally, traffic-demand data have been determined from operational measurements provided at switching nodes and the data measured at the individual nodes were processed to provide an estimate of traffic demand during selected measurement intervals. The estimated traffic demands, together with the network-connectivity data and a specified routing discipline, may then be used to determine required capacity enhancement, if any. Several methods for measuring network performance are known in the art, some of which are outlined below.

(I) Applicant's U.S. patent application Ser. No. 10/738,895 filed on Dec. 17, 2003 and titled "Self-provisioning Node and Network" discloses a method of network self-provisioning based on the use of real-time measurements and provisioning servers.

(II) U.S. patent application Ser. No. 10/661,705, Klotz et al., publication number 20040054776, titled "Network expert analysis process", discloses a method for analyzing a network. The method comprises steps of capturing at least one bidirectional data trace from the network; determining a network topology; analyzing protocols in conversations between initiators and targets to determine if the protocols are valid using the determined network topology and known protocol standards; and displaying at least one of errors or warnings determined in the protocol and metrics calculated from the analysis of the protocols to a user. The protocol-analysis step applies protocol experts to the data trace and generates metrics based upon the topology and the analyzed protocols.

(III) A method of measuring differential one-way propagation delays along each route in a route set having at least two candidate routes from a first node to a second node is disclosed in Applicant's U.S. patent application Ser. No. 10/316,557, filed on Dec. 11, 2002 and titled "Expandable universal network", the specification of which is incorporated herein by reference. The method comprises steps of: sending a timing message at the first edge node along each of the at least two candidate routes; recording time information at each subsequent edge node along the route; recording a queuing delay at each subsequent edge node along the route; computing differential propagation delays at the second node; and communicating a result back to a source node.

(IV) U.S. Pat. No. 6,853,708, issued on Feb. 8, 2005 to Zellner et al. and titled "End-to-end network testing" discloses a method for testing a communication network. The method comprises steps of:

(1) transmitting a first signal from a first point to a second point of the communication network, wherein the first and the second points are remotely located;

(2) recording at the first point a first time value of the transmitting using a first clock;

(3) receiving a second signal at the second point of the communication network;

(4) recording at the second point a second time value using a second clock, wherein the first clock and the second clock each operate from substantially similar references;

(5) comparing the first signal and the second signal as a function of the first and second time values; and (6) determining at least one performance characteristic of the communication network based on the comparing.

(V) U.S. Pat. No. 6,839,328, issued on Jan. 4, 2005 to Lau at al. and titled "Measurement of packet loss ratio in a network using end-point data", discloses a method for measuring data loss rate in a network having an ingress network element and an egress network element. The method comprises the steps of: measuring the data count into the network at the ingress network element; measuring the data count out of the network at the egress network element; calculating the difference between the data count into the network and the data count out of the network for each of a plurality of predetermined intervals to generate a data difference signal; applying a low pass filter to the data difference signal to generate a filtered data difference signal; calculating the standard deviation of the filtered data difference signal using data immediately prior to a predetermined window; calculating the data loss rate based on the filtered data difference signal in the predetermined window; and reporting the data loss rate if the data loss rate exceeds a predetermined threshold based on the computed standard deviation of the filtered difference signal.

(VI) U.S. Pat. No. 6,807,156 issued to Veres et al. on Oct. 19, 2004, and titled "Scalable real-time quality-of-service monitoring and analysis of service dependent subscriber satisfaction in IP networks" discloses a method of monitoring quality of service for an identified subscriber in a packet data network. The method comprises the steps of:

(a) installing a monitor in the network, the monitor being in communication with inbound and outbound packets;

(b) selecting a subset of all subscribers in the network to be currently monitored, the subset being representative of the identified subscriber;

(c) accepting a plurality of data packets, at the monitor, each of the data packets having a header that identifies source and destination subscriber addresses, identifies a communication protocol, and identifies an application;

(d) preprocessing the accepted packets to identify packets from the subset of currently monitored subscribers, strip off header information from the identified packets, and store the header information in a shared memory;

(e) utilizing a hashing function to create a micro-flow record that includes quality-of-service statistics for a plurality of data packet streams, each stream of data packets being associated with a different application being utilized by subscribers in the network;

(f) creating a user-flow record that includes aggregate quality-of-service statistics for all applications being utilized by the identified subscriber;

(g) providing the preprocessed header information from each identified data packet to an application-dependent statistical calculation function corresponding to the application identified in each header;

(h) calculating quality-of-service statistics for the identified application utilizing the corresponding application-dependent statistical calculation function;

(i) updating the quality-of-service statistics in the micro-flow record for the identified application; and (j) updating the aggregate quality-of-service statistics in the user-flow record for the identified subscriber.

Each of the above methods applies to a specific network. The objective of the measurement scheme of the present invention is to monitor the performance of multiple core media connecting a set of edge nodes.

Darwinian Network Measurements

In order to enable measurements of data loss and data delay in a Darwinian Network 100, some or all of the edge nodes may participate in a performance-measurement process. In order to reduce the measurement effort and consumption of network resources, probing signals may be used instead of monitoring payload packets. A probing signal for a network of multiple core media includes fields to identify a core medium and the route taken in each core medium.

The participating edge nodes implement a process of performance evaluation and may be provided with means for generating probing signals and means for time measurement. The proportion and timing of probing signals may be determined according to statistical confidence analysis. A participating edge node may be provided with a probing-packet cyclical counter in order to assign consecutive serial numbers to probing signals sent along each end-to-end route emanating from the edge node. A participating edge node may also be provided with a local cyclical time indicator of a predefined cyclical period. A time counter of appropriate width may be used for this purpose. The width of a probing-packet counter may be specific to the source edge node. However, all time counters in all participating edge nodes preferably have the same width and the same counter-cycle duration.

Darwinian Network Self-Evaluation

A Darwinian network preferably evaluates the performance of its core media in order to rank the core media and facilitate a process of technology selection. In order to determine the 'fittest' core media in a Darwinian network, a mechanism for performance evaluation of each core medium need be provided. Such a mechanism is preferably based on measurements.

The evaluation may be based on source-to-sink measurements along routes through different core media. A simple way is to randomly transmit probing signals from each source edge node to each sink node through the different core media. The purpose of the probing signals is to collect information leading to characterizing the performance of each core medium. The main performance aspects of interest are data signal loss and delay. Each source edge node may therefore include in each probing signal destined to a sink node an indication of a cyclical signal number and a cyclical time at which the probing signal is transmitted. Using this information, a sink node receiving a probing signal can determine a count of missing probing signals, if any, and a measure of relative delay. The deduced performance information may be aggregated over pre-selected time intervals. The aggregated information may then be sent to network evaluator 180 (FIGS. 1 and 2) for use in a process of ranking the core media. The probing signals are sent at a rate that is sufficient to yield statistically significant results.

Network evaluator 180 uses performance data, together with other cost data and metrics derived from intangible aspects, to rank the core media. The ranking may then be used to promote a preferred core medium and to gradually freeze or discard a non-competitive core medium. Well known methods of sampling and parameter estimation may be employed for this purpose.

Figure 12:
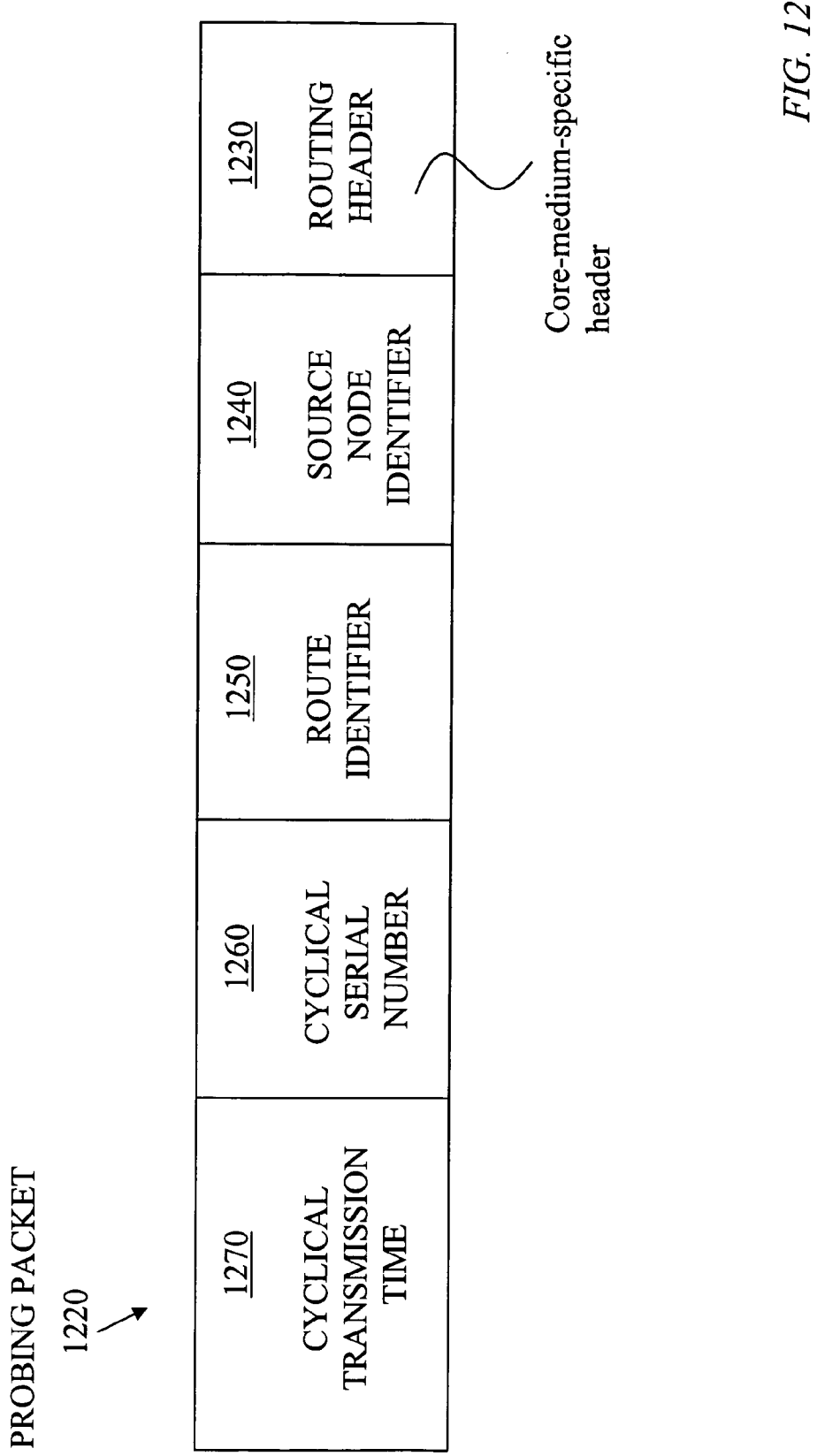
FIG. 12 illustrates a format of a probing signal for use in network self-evaluation, in accordance with an embodiment of the present invention.

FIG. 12 illustrates an exemplary format 1220 of a probing signal for use in network self-evaluation according to the present invention. The probing signal includes a core-medium-specific routing header 1230, a source-node identifier 1240, a route identifier 1250, a cyclical probing-signal serial number 1260, and a cyclical probing-signal transmission time index 1270.

Each edge node 110 has a description of a set of routes to each sink node in the network. Each edge node has a unique identifier, and each route emanating from an edge has a unique route identifier. Each probing signal 1220 sent along a given route is given a serial number in field 1260 and an indication of transmission time. The serial number is cyclic, for example between 0 and $(2^8-1)$ and the transmission time is determined as a reading of a time counter. For example, using a time counter of 24 bits, with a time-slot duration of one microsecond for example, the cyclical time period would exceed 16 seconds, which is orders of magnitude larger than the expected round-trip delay for any source-sink node-pair. The purpose of the serial number is to facilitate measuring packet loss (probing-signal loss) and the purpose of the transmission time indicator is to measure the delay for tested routes, including both propagation delay and queuing delay.

Each edge node participating in core-media evaluation determines a receiving-time indicator for each of the incoming probing signals and determines a relative delay index as the difference between the cyclical receiving-time indicator and the cyclical sending-time indicator. If the difference is a negative number, the difference is added to the predefined cyclical period. For example, if the time-counter width is 24 bits, thus having a cyclical period of 16,777,216 clock ticks and producing consecutive numbers ranging from 0 to 16,777,215 at consecutive clock ticks, and if a probing signal is transmitted at time-counter reading 16,776,200 and received at time counter reading of 00,000,080, then the delay experienced is (16,777,216+00,000,080−16,776,200), i.e., 1096 ticks. With tick duration of one microsecond, for example, the delay is determined to be 1.096 milliseconds.

To count lost probing signals, if any, a participating edge node parses a received incoming probing signal to determine:
 (a) an identifier of the sending edge node, in field 1240;
 (b) a route identifier, relative to the sending edge node, in field 1250; and
 (c) the serial number carried by the received probing signal in field 1260.

An edge node determines a route identifier and a current serial number for each incoming probing signal and compares the current serial number with a serial number of a previous incoming probing signal having the same route identifier. The current cyclical probing-signal serial number is retained for future use as a previous cyclical probing-signal serial number. The probing-signal serial numbers are bounded. A data-loss record is created if said current serial number and the previous cyclical probing-signal differ by more than a specified gap. The specified gap would normally be unity. A negative gap indicates a transition to a new cycle of serial numbers and is corrected by adding the length of the predefined cycle of serial numbers. For example, with a one-byte serial number, i.e., the predefined length of the cycle of serial numbers is 256, the largest serial number 255 is followed by 0. The gap is then (−255) which is automatically adjusted to 1. If the current serial number equals 1 and the previous serial number is 255, the gap becomes (−254) which is corrected to 2 indicating a loss of one probing signal.

The receiving edge node may also retain the relative delay index to determine a first characterization of relative delays associated with each route and transmits the first characterization to a network processor (network evaluator 180, FIGS. 1 and 2). Likewise, the receiving edge node may aggregate the data-loss records to determine a second characterization of data loss associated with each route and transmit the second characterization to the network evaluator 180.

Network Evaluation Module

The global network evaluator 180 executes a process of self evaluation. A method of network evaluation, according to the present invention comprises steps of:
 (1) transmitting outgoing probing signals to selected destination edge nodes, each probing signal being identified by a source edge node and an end-to-end route, from each of a subset of edge nodes from among a plurality of edge nodes to selected destination edge nodes;
 (2) receiving incoming probing signals transmitted from a subset of the plurality of edge nodes;
 (3) processing the incoming probing signals to determine performance indices of each of the core media; and
 (4) reporting the performance indices to the global network evaluator 180.

Thus, a Darwinian network may comprise several core media each including a respective type of core nodes, and edge nodes each having at least one, dual communication channel to at least one core node in at least one of the core media. Selected edge nodes (or all of the edge nodes) may participate in exchanging signals aimed at measuring the performance of individual core media.

Performance Indices

As described above, a probing signal 1220 (FIG. 12) may comprise:
 (a) a core-medium-specific routing header 1230 for use in routing each of the outgoing signals through a selected core medium;
 (b) an identifier 1240 of a source edge node from which the each of the outgoing signals is transmitted;
 (c) an identifier 1250 of a route starting from the source edge node;
 (d) a cyclical probing-signal serial number 1260 assigned by the source edge node for the route; and
 (e) a cyclical sending-time index 1270 at which the each of the outgoing signals is transmitted, the cyclical sending-time index being determined from a local time indicator at the source edge node.
 Other fields may be added to facilitate the exchange of information related to other network monitoring or control functions.

The controller 270 (FIG. 2) of each edge node that receives a probing signal from a sending edge node counts probing-signal loss, if any, and determines a relative delay over the route identified in the received probing signal. The actual one-way delay along the identified route includes the propagation delay and the queuing delay, if any, within the respective core medium. The relative delay is determined as the difference between the reading of a time counter at the receiving edge node and the cyclical transmission time indicated in field 1270 of the received probing signal. This difference does not account for the unknown time shift between the time counters at the sending edge node and the receiving edge node. The unknown time shift can be mitigated by using a round-trip probing signal. However, the objective is to compare delay along routes in different core media and the time shift for a specific edge-node pair is common to all routes connecting the specific edge-node pair.

Rather than sending real-time delay or loss data to the global network evaluator 180, the controller 270 of an edge node may aggregate the data over predetermined intervals of time and report only the aggregated data directly to the global network evaluator 180 or through some other network-processing facility.

Addressing in a Darwinian Network

A Darwinian network may include a legacy core medium with a preset addressing scheme. Currently, there are two main commercial legacy networks of global coverage. The first is the telephone network and the second is the Internet. The addressing scheme in the telephone network is difficult to expand and the addressing scheme of the Internet is awkward. A simpler scheme with inexhaustible addressing space is preferred for the proposed Darwinian network.

One such scheme is disclosed in U.S. Pat. No. 6,771,651 issued to Beshai et al. on Aug. 3, 2004 and titled "Providing access to a high-capacity packet network". The scheme is illustrated for a hybrid network which combines a high-capacity network and a legacy packet network where universal edge nodes may connect to both the high-capacity network and the legacy network. The high-capacity network is structured to have high transport efficiency and to avoid the need for complex protocols. The address space is virtually unlimited and the addressing scheme has the potential to allow enormous growth in numbers of nodes interconnected and to provide many of the services provided by the legacy packet network (the present Internet for example) as well as many services not yet imagined. To take advantage of such a high-capacity network, traffic sources/sinks must be provided access to the high-capacity network in a simple and straightforward manner. An edge node in the high-capacity network can assign an address to each subtending traffic source and its associated traffic sink. Data transfer from the legacy packet network to the high-capacity network and vice versa may be facilitated by requiring that some edge nodes understand both a simple routing protocol, specific to the high-capacity network, and conventional protocols, such as the Internet protocols.

According to U.S. Pat. No. 6,771,651, a device number is automatically assigned to an access device when the access device connects to an edge node, if a device number has not already been assigned. Upon receipt of an indication of a traffic source from the access device, a user number is automatically assigned to the traffic source, if not already assigned. Upon assigning the user number, a sub-network address for the traffic source is formulated and broadcast to a pre-defined set of nodes. Each edge node connecting to the high-capacity network is adapted for performing this method.

A method of routing of packets through a hybrid network comprising the present Internet and an envisaged multi-pet-abits-per-second network of a simple structure and employing simple protocols is also disclosed in U.S. Pat. No. 6,771,651. The addressing scheme and the routing method may be adapted for application to the multi-core-medium network 100 of the present invention.

Route-Set-Based Source Routing

Several methods of routing in telecommunications networks are known in the art. The preferred method of routing in the Darwinian network 100 (FIG. 1) is based on source routing where each edge node determines and stores a description of a set of routes to each sink node in the network. U.S. Pat. No. 6,768,718 issued to Beshai et al. on Jul. 27, 2004 and titled "Courteous routing" discloses a method of source routing based on storage of route sets where the selection of a route attempts to maximize the overall throughput. The method may be adapted to apply to the multi-core-medium of the present invention. If each edge node in the Darwinian network is connected to at least one core node in each of the core media, a route set from a source edge node to a sink edge node may comprise routes each of which is confined within a single medium. With varying edge-node connectivity, where some edge nodes may connect to all core media while others connect to a subset of the core media, a route set may include routes in each core medium to which both the source and sink edge nodes connect as well as routes traversing two or more core media. Selecting a route set then requires careful evaluation of merits of feasible routes. The use of the courteous-routing scheme disclosed in the aforementioned U.S. Pat. No. 6,768,718 would realize high network efficiency and may be adapted for use in network 100 of the present invention.

In review, to circumvent the difficulty of upgrading the Internet, a new network may be introduced to operate in parallel with minimum interaction. Ideally, each traffic source should be able to select one of the two networks and the junction of the two networks should be as close to source as possible. Practically, an edge node, typically supporting numerous traffic sources and sinks, may be the junction of the two networks. In general, a dual-core network may evolve to a multi-core network as new generations of switching equipment, such as purely photonic switches, emerge and the edge node is then required to be universal, with the ability to communicate with any network core.

The described embodiments are to be considered as illustrative and not restrictive. It will be apparent to a person skilled in the art that variations and modifications to the embodiments may be made within the scope of the following claims.

What is claimed is:

1. An edge node comprising:
   a plurality of input ports, at least one input port connecting to traffic sources and at least one input port connecting to at least one core medium from among a plurality of core media;
   a plurality of output ports, at least one output port connecting to traffic sinks and at least one output port connecting to at least one core medium from among said plurality of core media; and
   an edge controller operable to control the functions of
      forwarding information signals received from said plurality of input ports to at least one core medium from among said plurality of core media; and
      forwarding probing signals along routes through at least one of said core media to a plurality of destination edge nodes;
   the edge node being operable to receive probing signals from other edge nodes from among said plurality of edge nodes, and including a network-evaluation processor operable to analyze said probing signals received from said other edge nodes to determine performance indices for at least one core medium from among said plurality of core media.

2. The edge node of claim 1 wherein each of said probing signals includes at least a serial number and an indication of sending time.

3. At a selected edge node in a network comprising a plurality of edge nodes interconnected by a plurality of core media, each of said edge nodes having a local cyclical time indicator of a predefined cyclical period, a method of performance evaluation comprising:
   transmitting outgoing probing signals to selected destination edge nodes from among said plurality of edge nodes through at least one of said core media;
   receiving incoming probing signals transmitted from a subset of said plurality of edge nodes through said at least one of said core media; and
   processing said incoming probing signals to determine performance indices of each of said at least one of said core media.

4. The method of claim 3 wherein each of said outgoing probing signals comprises:
   a core-medium-specific routing header for use in routing said each of said outgoing signals through a selected core medium;
   an identifier of said selected edge node from which said each of said outgoing signals is transmitted;
   an identifier of a route starting from said selected edge node;
   a cyclical probing-signal serial number assigned by said selected edge node for said route; and
   a cyclical sending-time index at which said each of said outgoing signals is transmitted, said cyclical sending-time index being determined from a local time indicator at said selected edge node.

5. The method of claim 4 wherein said processing further includes steps of:
   determining a receiving-time indicator at said selected edge node for each of said incoming probing signals; and determining a relative delay index as the difference between said cyclical receiving-time indicator and said cyclical sending-time index in said each of said incoming probing signals, and, if said difference is a negative number, adding to said difference said predefined cyclical period.

6. The method of claim 4 wherein said processing further includes steps of:

determining a current cyclical probing-signal serial number for a current incoming probing signal of said incoming probing signals;

determining a current route identifier from said current incoming probing signal;

comparing said current cyclical probing-signal serial number with a respective cyclical probing-signal serial number of a previous incoming probing signal, said previous incoming probing signal having a route identifier equal to said current route identifier;

retaining a data-loss record if said current cyclical probing-signal serial number and said previous cyclical probing-signal differ by more than a specified gap; and retaining said current cyclical probing-signal serial number for future use as a previous cyclical probing-signal serial number.

7. The method of claim 5 including a further step of aggregating said relative delay index to determine a first characterization of relative delays associated with each said incoming probing signal and transmitting said first characterization to a network processor.

8. The method of claim 6 including a further step of aggregating said data-loss record to determine a second characterization of data loss associated with each said incoming probing signal and transmitting said second characterization to a network processor.

* * * * *